US005579048A

United States Patent [19]
Hirasawa

[11] Patent Number: 5,579,048
[45] Date of Patent: Nov. 26, 1996

[54] SELECTION APPARATUS USING AN OBSERVER'S LINE OF SIGHT

[75] Inventor: Masahide Hirasawa, Sagamihara, Japan

[73] Assignee: Canon Kabushiki Kaisha, Tokyo, Japan

[21] Appl. No.: 280,926

[22] Filed: Jul. 26, 1994

[30] Foreign Application Priority Data

Jul. 30, 1993 [JP] Japan ............................ 5-208721

[51] Int. Cl.⁶ .................................................. H04N 5/232
[52] U.S. Cl. .......................................... 348/333; 348/334
[58] Field of Search .................................. 348/333, 334, 348/207, 373; 354/219; H04N 5/232

[56] References Cited

U.S. PATENT DOCUMENTS

| | | | |
|---|---|---|---|
| 4,109,145 | 8/1978 | Graf | 250/201 |
| 4,823,170 | 4/1989 | Hansen | 356/375 |
| 5,008,757 | 4/1991 | Kimura et al. | 348/334 X |
| 5,212,556 | 5/1993 | Ogawa | 348/334 X |
| 5,245,381 | 9/1993 | Takagi et al. | 354/219 X |

FOREIGN PATENT DOCUMENTS 5183798  7/1993  Japan ............................ H04N 5/232

Primary Examiner—Wendy R. Greening
Attorney, Agent, or Firm—Fitzpatrick, Cella Harper & Scinto

[57] ABSTRACT

A selection apparatus including a display unit for indicating a plurality of displays on the same screen, a line-of-sight position detecting unit for detecting a line-of-sight position of an operator on the screen, and an input unit through which the operator inputs an instruction, the input unit operating without using a line of sight. The selection apparatus also includes a control unit. When the display unit displays all of the displays on the same screen in response to an instruction input through the input unit, and the line-of-sight position detecting unit detects the line-of-sight position on any of the displays, the control unit selects the display on which the line-of-sight position has been detected. The control unit differentiates a status of display of the selected display from those of the non-selected displays. The control unit then executes the contents of the selected display. Preferably, for example, a photographer may perform function selection by manipulating a switch while looking at a function menu displayed on the screen.

68 Claims, 27 Drawing Sheets

FIG. 19

| 1 | 2 | 3 |
|---|---|---|
| 4 | 5 | 6 |
| 7 | 8 | 9 |

FIG. 20

| ADDRESS | MENU |
|---|---|
| 1 | TITLE ON / OFF |
| 2 | |
| 3 | AF ON |
| 4 | |
| 5 | |
| 6 | |
| 7 | FADE |
| 8 | |
| 9 | DATE ON / OFF |

SELECTION APPARATUS USING AN OBSERVER'S LINE OF SIGHT

BACKGROUND OF THE INVENTION

1. Field of the Invention

The present invention relates to a selection apparatus which is to be used when an operator selects a desired function from a plurality of functions of a multi-function apparatus using, in particular, the operator's line of sight.

2. Description of the Related Art

A "function operation," which requires an operator of an apparatus to visually observe changes in circumstances during operation so as to operate the apparatus in accordance with the circumstances thus observed, is very common in apparatuses produced as consumer goods as well as in apparatuses for use in special fields. Typical examples of such apparatuses produced as consumer goods include automobiles and cameras. Typical examples of the apparatuses for use in special fields include machining apparatuses equipped with a microscope and remote control apparatuses using a video camera.

In particular, in a functional apparatus, such as a camera or a microscope, in which the operator applies his or her eye to the eyepiece section when operating the apparatus, it is necessary that the switches and other operating members should be situated in such a way that the operator can be sure of their positions without a visual check. It would be inconvenient for the operator if he had to separate the eye from the eyepiece section upon each operation to be sure of the position of the relevant switch or operating member. Moreover, the need to visually check the position of the switch, etc. would make it impossible for the operator to visually observe changes in the circumstances, with the result that there is a fear that the apparatus will be prevented from being properly operated.

In view of this, various ideas have been proposed regarding the arrangement of switches, operating members, etc. of such apparatuses.

In the field of cameras, for example, an arrangement is generally adopted in which the release button is situated where the forefinger naturally comes to rest when the user holds the camera in his hands. Similarly, in a video camera, the recording start switch is generally situated where the thumb rests, and the scaling switches are arranged where the index and middle fingers are to be placed. Further, the plurality of function switches with which the camera is equipped are made in different sizes or provided with rough surfaces having different peculiar feels to the touch so that the switches may be easily identified, whereby it is possible for a multi-function apparatus to be correctly operated.

In functional apparatuses produced as consumer goods, a rapid reduction in size and weight is in progress with the increase in the number of functions. The reduction in size and weight has led to a substantial reduction in the surface area of the apparatus, resulting in a problem that all the switches cannot be arranged on the apparatus or, if they can, no space is available for imparting distinctive sizes and shapes to them. Further, as a result of the increase in the number of functions, there has emerged a problem that there is a limit to the variety of rough surfaces, i.e., the different peculiar feels to the touch, to be imparted to the plurality of switches.

FIG. 1 shows an example of the layout of basic function selecting switches in a conventional video camera. In the drawing, numeral 1 indicates a video camera having a body 2, on a side surface of which there are arranged: a switch 3 for effecting superimposition of a character title on an image, a switch 4 for effecting fade-in and out, a switch 5 for imparting dates to pictures, a switch 6 for switching between auto and manual focusing, etc. Further, scaling switches 7 and 8 for scaling in the tele-end and wide-angle-end directions are arranged in that section of the body 2 where the index and middle fingers of the photographer lie. When the photographer 9 photographs a subject 11 while observing it through a finder 10 in the body 2, he manipulates the above switches 3 through 8 as needed.

Thus, in the conventional video camera 1, it is necessary to manipulate a number of switches, 3 through 8, during photographing, which is not only inconvenient but may also lead to an uncertain manipulation of the switches, resulting in an erroneous operation.

In an actual multi-function video camera, more switches are provided in addition to the switches 3 through 8 shown in FIG. 1. Thus, it is practically impossible to correctly manipulate such a large number of switches without visually checking their positions.

To overcome this problem, the present inventor proposed in Japanese Patent Applications No. 3-257795 and 4-202 a system (which will be referred to as the "prior invention") according to which camera function menus are displayed in the finder through which the photographer looks when photographing and, from the line of sight of the photographer, which is observed by a line-of-sight detector arranged in the eyepiece section, it is determined at which of the function menus displayed in the finder he is gazing. Then, the function corresponding to the function menu the photographer is gazing at is caused to be carried out, thus enabling the photographer to properly select a desired function without separating his eye from the finder.

In the above-described system of the previous invention, selection of a menu from the selectable function menus displayed in the finder is executed far less often as compared with the operation of the entire apparatus (i.e., photographing). Therefore, there is no need to constantly display the function menus in the finder. If constantly displayed in the finder, the menus would become a nuisance to the user, who keeps looking through the finder throughout the operation. Further, for the function menus to be displayed in the finder in such a way as not to be an obstacle to the operation the user performs while looking through the finder, the number of function menus must be limited.

In addition, the above system, in which the line of sight of the operator is constantly observed so as to make the apparatus always ready for any of the functions looked at by the operator, has a problem in that the operator may look at the wrong menu, resulting in malfunction of the camera.

SUMMARY OF THE INVENTION

According to an embodiment of the present invention, there is provided a selection apparatus in which not only can the operator select a desired function without a visual check of the relevant switch, but such selection is optional according as whether the operator desires to do so or not. For improved operability, the apparatus includes: a display means for displaying a plurality of display items on the same screen; line-of-sight position detecting means for detecting a line-of-sight of an operator on said screen; an input means by which the operator inputs instructions to the apparatus; and a control means for performing a selecting operation according to the line-of-sight position and the input instructions.

According to another aspect of the present invention, a selection apparatus comprises display means for indicating a plurality of displays on the same screen. Line-of-sight position detecting means are provided for detecting a line-of-sight position of an operator on the screen. Input means are provided through which the operator inputs an instruction. Control means are provided which, when the line-of-sight position detecting means detects the line-of-sight position on any of said displays, and an instruction is input through said input means, selects the display on which the line-of-sight position has been detected.

According to yet another aspect of the present invention, a selection apparatus includes display means for indicating a plurality of displays on the same screen. Line-of-sight position detecting means is provided for detecting a line-of-sight position of an operator on the screen. Input means are provided through which the operator inputs an instruction. Control means are provided which, when said display means indicates all the displays on the same screen in response to an instruction input through said input means, and said line-of-sight position detecting detect the line-of-sight position of any of said displays, selects the display on which the line-of-sight position has been detected and executes the contents of the display thus selected.

According to a further aspect of the present invention, a selection apparatus comprises display means for indicating a plurality of displays on the same screen. Line-of-sight position detecting means are provided for detecting a line-of-sight position of an operator on the screen. Control means are provided which, when the display means indicates all the displays on the same screen by illuminating them, and said line-of-sight position detecting means detects the line-of-sight position on any of said displays, control said display means in such a way that the display at which said line-of-sight position has been detected is flashed.

According to a further aspect of the present invention, a selection apparatus includes a display means for indicating a plurality of displays on the same screen. Line-of-sight position detecting means is provided for detecting a line-of-sight position of an operator on said screen. Input means are provided through which the operator inputs an instruction. Control means are provided which, when said input means is in a first condition, selects one of said displays in accordance with said line-of-sight position, and, which, when said input means is in a second condition, executes the contents of the display selected.

According to yet a further aspect of the present invention, a selection apparatus includes display means for indicating a plurality of displays on the same screen. Line-of-sight position detecting means are provided for detecting a line-of-sight position of an operator on said screen. Input means are provided through which the operator inputs an instruction. Control means are provided which, if said line-of-sight position detecting means detects said line-of-sight position on one of said displays when said input means is in a first condition, selects the display on which said line-of-sight position has been detected and moves the selected display in accordance with a movement of said line-of-sight position, and, which, when said input means is in a second condition, stops the movement of the display.

According to yet another aspect of the present invention, a selection apparatus comprises display means for indicating a plurality of displays on the same screen. Line-of-sight position detecting means are provided for detecting a line-of-sight position of an operator on said screen. Input means are provided through which the operator inputs an instruction. Control means are provided which, when said input means is in a first condition, extinguishes the display given by said display and, which, when said input means is in a second condition, selectively shows a display obtained by said display means at the line-of-sight position detected.

Other objectives and features of the present invention will become apparent from the following detailed description and the accompanying drawings.

BRIEF DESCRIPTION OF THE DRAWINGS

FIG. 19 is a conceptual diagram showing display areas in a selection apparatus;

FIG. 20 is a diagram showing a table for storing function menus in a selection apparatus;

DESCRIPTION OF THE PREFERRED EMBODIMENTS

Embodiments of the present invention will now be described with reference to FIGS. 2 through 27.

Figure 2:
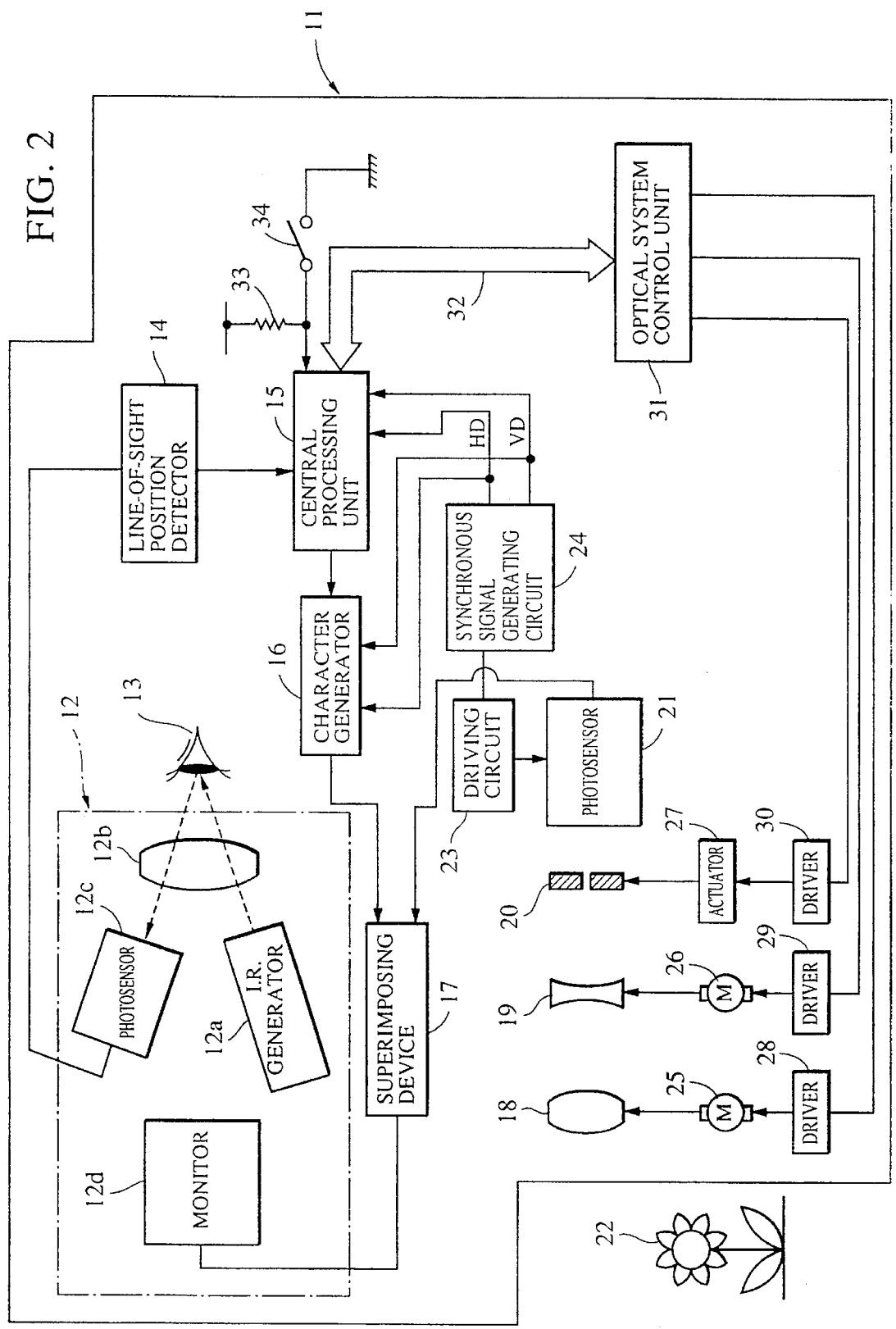
FIG. 2 is a block diagram showing the construction of a video camera equipped with a selection apparatus according to an embodiment of the present invention.

First, an embodiment of the present invention will be described with reference to FIGS. 2 through 6. FIG. 2 is a block diagram showing the construction of a video camera equipped with a selection apparatus according to an embodiment of the present invention. In the drawing, numeral 11 indicates a video camera having a finder 12 comprising an infrared ray generator 12a, an eyepiece 12b, a photoelectric conversion element 12c and a monitor 12d. An infrared ray from the infrared ray generator 12a is applied to an eyeball 13 of the photographer through the eyepiece 12b and reflected by the eyeball 13. The infrared ray, reflected by the eyeball 13, is received by the photoelectric conversion element 12c, and the received image is converted into an electric signal, which is supplied to a line-of-sight position detector 14.

The line-of-sight position detector 14 detects the line of sight of the photographer on the basis of the electric signal supplied from the photoelectric conversion element 12c so as to detect at what section of the monitor 12d the photographer is gazing. A line-of-sight position data signal output from the line-of-sight position detector 14 is supplied to a central processing unit 15 of a microcomputer or the like. The central processing unit 15 controls the entire video camera 11.

Numeral 16 indicates a character generator for displaying function menus. It is controlled by a control signal output from the central processing unit 15. Whether to display the function menus or not, what kinds of function menus to display and at what position of the monitor 12d, etc. are determined by the central processing unit 15. The central processing unit 15 controls the character generator 16, and a function menu display signal for displaying a function menu on the monitor 12d is supplied from the character generator 16 to a superimposing device 17.

The superimposing device 17 superimposes the function menu signal supplied from the character generator 16 on a video signal supplied from an image pick-up photoelectric conversion element 21, which will be described below, before showing them on the monitor 12d of the finder 12. The video signal input to the superimposing device 17 comprises image information on a subject 22 projected onto the image pick-up photoelectric conversion element 21 through an optical system comprising a focusing lens 18, a scaling lens 19, an aperture 20, etc.

The image pick-up photoelectric conversion element 21 is driven by a driving circuit 23, to which a signal indicative of drive timing is supplied from a synchronous signal generating circuit 24. The synchronous signal generating circuit 24 supplies the central processing unit 15 and the character generator 16 with vertical and horizontal synchronous signals for checking a display position on the monitor 12d of the finder 12.

The focusing lens 18, the scaling lens 19 and the aperture 20 are moved by actuators 25, 26 and 27 corresponding to them, respectively. The actuators 25, 26 and 27 are driven by drivers 28, 29 and 30 corresponding to them, respectively. The drivers 28, 29 and 30 are controlled by an optical system control unit 31, which can communicate with the central processing unit 15 through a communication path 32.

Figure 3:
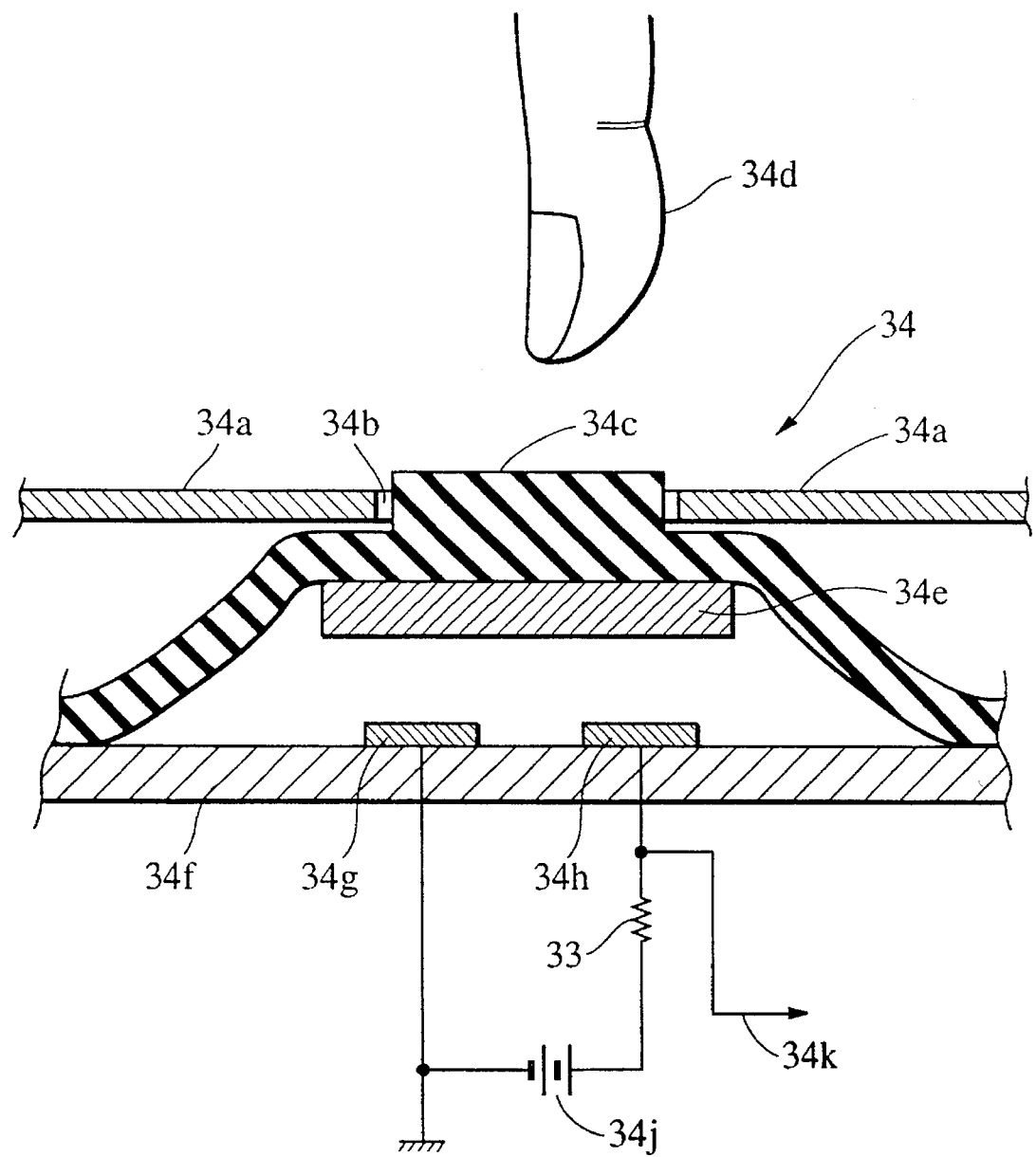
FIG. 3 is an external view of the video camera.

Numeral 33 indicates a pull-up resistor, and numeral 34 indicates an electro-mechanical switch (hereinafter referred to as the "E.M switch") which is to be operated when the operator selects a function menu. The E.M switch 34 comprises a push-button switch of a normally-open type and includes, as shown in FIG. 3, an armor section 34a having an opening 34b, through which a push-button section 34c is exposed. When the push-button section 34c is depressed by a finger 34d of the operator against the resilient force of the switch, a conductor 34e, which is provided on the back side of the push-button section 34c, comes into contact with first and second contacts 34g and 34h, which are provided on a base plate 34f, to bring the contacts 34g and 34h into conduction. Further, when the contacts 34g and 34h are not in conduction, an output line 34k, pulled up by a battery 34j and the pull-up resistor 33, is provided. Then, when the depression of the push-button section 34c by the finger 34d is cancelled, the push-button section 34c returns to the initial position by its own resilient force. As a result, the conductor 34e is separated from the first and second contacts 34g and 34h, whereby the contacts 34g and 34h are brought out of conduction, and the output line 34k is pulled up by the battery 34j and the pull-up resistor 33.

Figure 4:
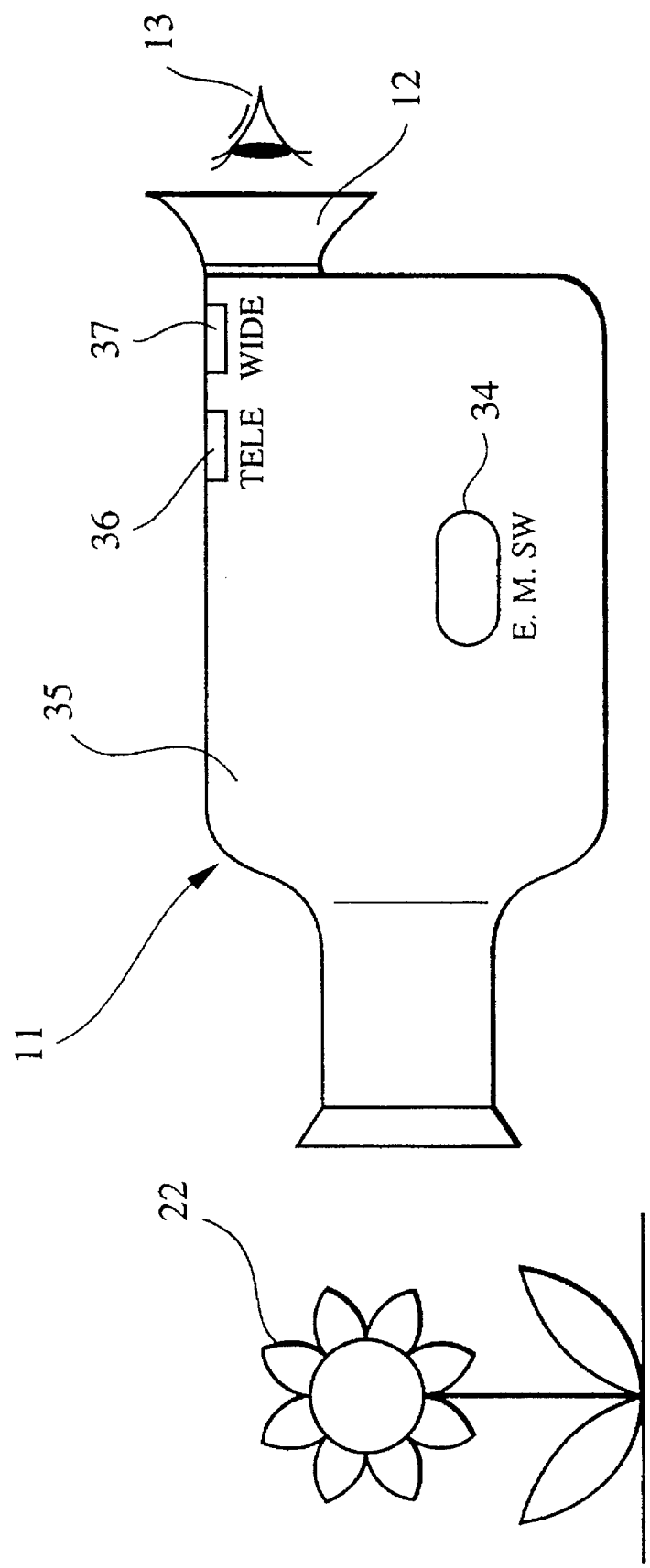
FIG. 4 is a diagram showing the construction of an E.M switch in the video camera.

As shown in FIG. 4, the E.M switch 34, constructed as described above, is arranged substantially at the center of a side surface of the body 35 of the video camera 11. In order that the photographer may easily feel the E.M switch 34 when operating the camera, no similar switches are arranged around the E.M switch 34. Further, according to the present invention, the number of switches for selecting functions is substantially reduced, so that it is possible to arrange a single E.M switch 34 on a relatively wide side surface of the body 35 of the video camera 11.

In FIG. 4, numerals 36 and 37 indicate scaling switches corresponding to the scaling switches 7 and 8 for scaling in the tele-end and wide-angle-end directions. These scaling switches are arranged at those positions on the surface of the body 35 where the index and middle fingers of the photographer are to be placed when the photographer holds the body 35 with his right hand during photographing.

Figure 5:
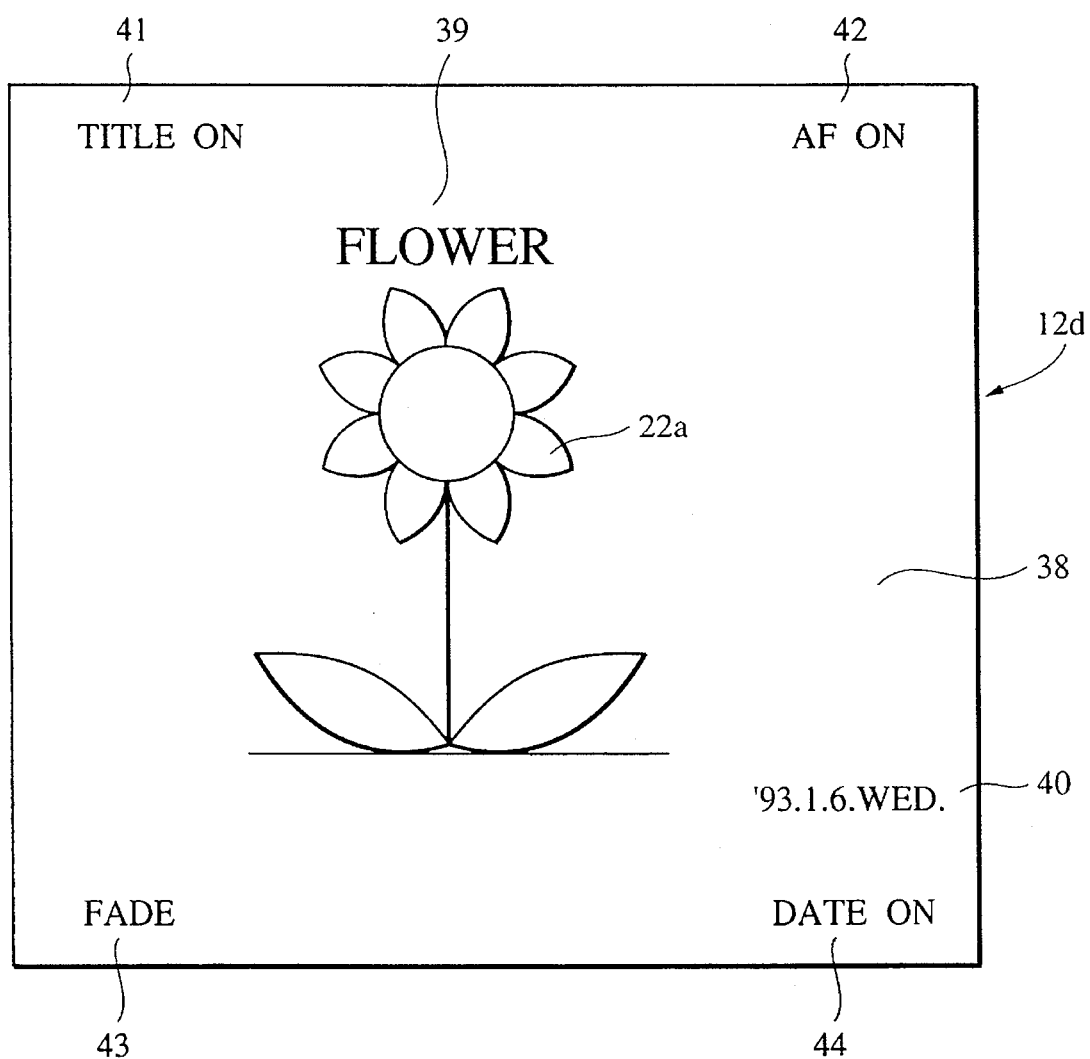
FIG. 5 is a diagram showing an example of the display of function menus shown in the finder of the video camera.

FIG. 5 is a diagram showing an example of an image shown on the monitor 12d of the finder 12. In the drawing, numeral 38 indicates the screen of the monitor 12d, which displays a title 39 and a date 40 as well as an image 22a of the subject 22. Further, the screen 38 of the monitor 12d displays, in a superimposed form, the following function menus: "TITLE ON(OFF)" 41 for turning on/off the display of the title 39 and superimposed recording; "AF ON(OFF)" 42 for turning on/off the autofocusing; "FADE" 43 for executing fading; and "DATE ON(OFF)" 44 for turning on/off the date.

Figure 6:
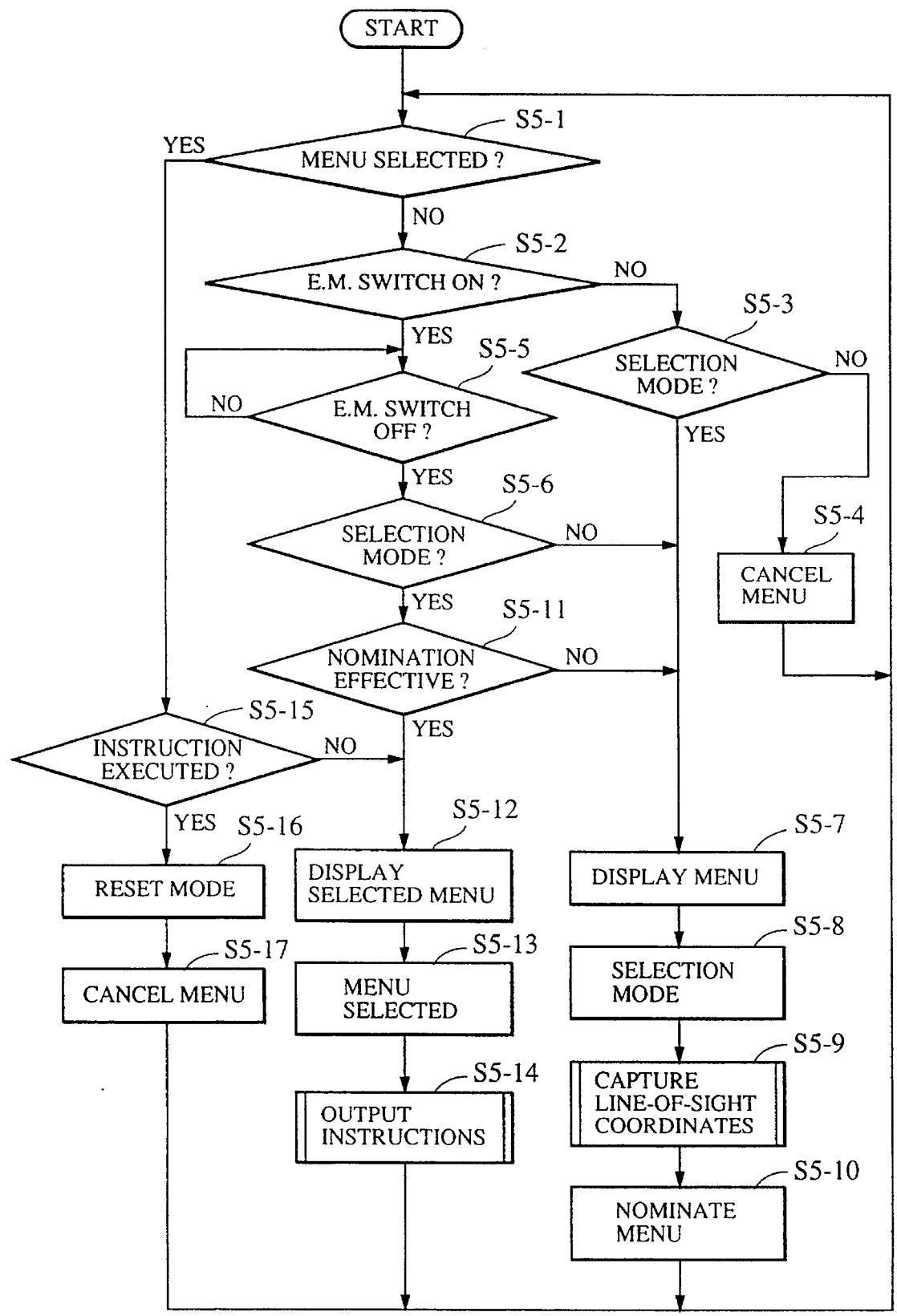
FIG. 6 is a flowchart showing the flow of selection procedures in the selection apparatus provided in the video camera.

FIG. 6 is a flowchart showing the flow of program operations executed in the central processing unit 15 in order to enable the photographer to perform function selection by manipulating the E.M switch 34 while looking at a function menu displayed on the screen 38 of the monitor 12d.

In FIG. 6, when the execution of this flow of operations is started, a judgment is first made in step S5-1 as to whether a "MENU SELECTION" flag is set or not. The "MENU SELECTION" flag is a flag for judging whether a function has been selected by the photographer or not and whether the execution of the relevant instruction has been started or not. At this stage, no menu selection has been executed yet, so that the "MENU SELECTION" flag is not set. Therefore, the judgment result in step S5-1 is NO, and the procedure advances to step S5-2.

In step S5-2, a judgment is made as to whether the E.M switch 34 is closed or not. When it is determined that the E.M switch 34 is open, the procedure advances to step S5-3, where a judgment is made as to whether a "SELECTION MODE" flag is set or not. The "SELECTION MODE" flag is a flag which indicates that function selection can be performed. At this stage, the E.M switch is not closed at all, so that the "SELECTION MODE" flag is not set. Accordingly, the judgment result in step S5-3 is NO, so that the procedure advances to step S5-4, where menu cancelling is effected, that is, the function menu display on the screen 38 of the monitor 12d is erased so that the photographer will not perform function selection. Then, the procedure returns to step S5-1.

If it is determined in step S5-2 that the E.M switch 34 is closed, the procedure advances to step S5-5, where a judgment is repeatedly made as to whether the E.M switch 34 has been opened or not until the switch is found to be open. When it is determined in step S5-5 that the E.M switch 34 is open, a function menu display is provided on the screen 38 of the monitor 12d, as described above, and the photographer gazes at a particular one of the function menus thus displayed on the screen 38, closing the E.M switch 34 again. The judgment in step S5-5 is made for the purpose of preventing the procedure from advancing too far to cause a particular function to be inadvertently selected even if the photographer holds E.M switch 34 closed for long after closing it for the first time.

Figure 1:
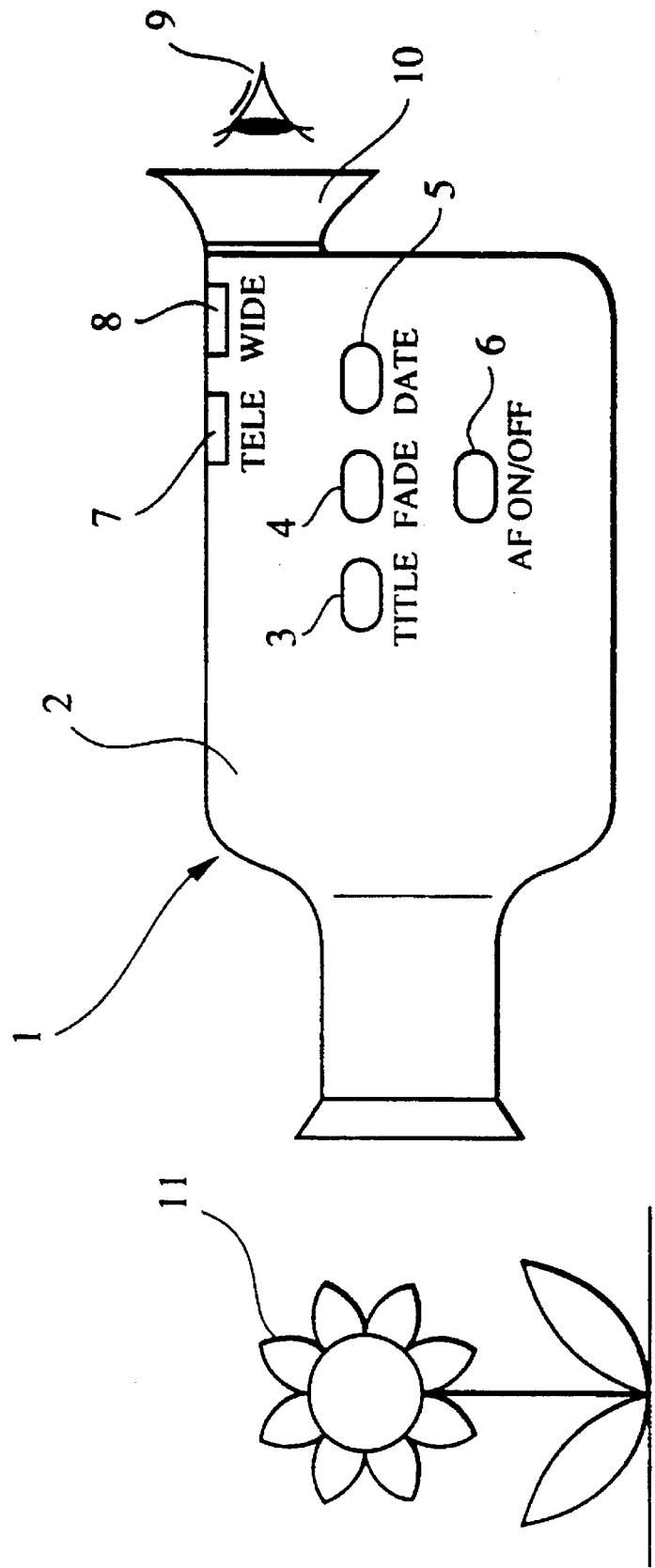
FIG. 1 is a diagram showing an example of the basic layout of function selecting switches in a conventional video camera.

When it is determined in step S5-5 that the E.M switch has been opened, the procedure advances to step S5-6, where a judgment is made as to whether the "SELECTION MODE" flag is set or not. As described above, when the E.M switch 34 is changed from the "closed" to the "open" state for the first time, the function menus are to be displayed, from this time on, on the screen 38, so the "SELECTION MODE" flag is not set at this state. Accordingly, the judgment result in step S5-6 is NO, and the procedure advances to step S5-7, where the function menus are displayed on the screen 38. Then, the "SELECTION MODE" flag is set in the next step, S5-8. After this, line-of-sight coordinate data from the central processing unit 15 of FIG. 1 is captured, and, in the next step, S5-10, the function menu corresponding to the line-of-sight position, which is being checked, is nominated as a candidate function to be selected. Then, the procedure returns to step S5-1.

While the photographer is selecting a function with his or her line of sight, the E.M switch 34 remains open. When the E.M switch 34 is open, it means that the photographer desires no function selection or that he is actually conducting it. In the present case, the "SELECTION MODE" flag is set, so that the processes of steps S5-1, S5-2 and S5-3 are successively passed through, and then the above-described procedures from step S5-7 onward are repeatedly executed.

After selecting a function, the photographer closes the E.M switch 34 again while gazing at the corresponding function menu, and then opens it again. This time the "SELECTION MODE" flag is set, so that the judgment result in step S5-6 is YES, and the procedure advances to step S5-11. In step S5-11, a judgment is made as to whether the function menu nominated in step S5-10 is valid or not. That is, when it is uncertain whether the photographer has closed the E.M switch 34 while reliably gazing at a particular function menu, the nominated function menu is regarded as invalid, and the procedures from step S5-7 onward are executed again to perform the function menu selecting operation over again.

When it is determined in step S5-11 that the nominated function menu is valid, the procedure advances to step S5-12, where the display of the function menus which have not been selected is erased, leaving the selected function menu only. Then, in step S5-13, a "MENU SELECTED" flag is set, and, in step S5-14, an instruction signal is supplied to the optical system control unit 31 from the central processing unit 15. Then, the procedure returns to step S5-1.

At this stage, the "MENU SELECTED" flag has been set in step S5-13, so that the judgment result in step S5-1 is YES, and the procedure advances to step S5-15. In step S5-15, a judgment is made as to whether the execution of the instruction according to the instruction signal, supplied to the optical system control system 31 from the central processing unit 15 of FIG. 2, has been completed or not. This judgment is possible by communication of the central processing unit 15 with the optical system control unit 31 through the communication path. If the execution of the instruction has not been completed yet, the procedures from step S5-12 onward are executed to continue the output of the instruction signal mentioned above.

When it is determined in step S5-15 that the execution of the instruction has been completed, the procedure advances to step S5-16, where the "SELECTION MODE" flag and the "MENU SELECTED" flag are reset. After this, the function menu displayed on the screen 38 is erased in step S5-17, and then the procedure returns to step S5-1, where the system is set in standby for another cycle of function selecting operation, which is started by manipulating the E.M switch 34.

To summarize the above description, when the photographer closes the E.M switch 34 once, the apparatus is set to the function selection mode, and function menus, such as "TITLE ON(OFF)" 41, "AF ON(OFF)" 42, "FADE" 43 and "DATE ON(OFF)" 44, shown in FIG. 5, are displayed in a superimposed form on the screen 38 of the monitor 12d. The photographer closes the E.M switch 34 again while he keeps on gazing at a desired menu of these function menus, whereby it is determined that an instruction to execute a particular one of the function menus has been given by the photographer, and the display of the other function menus is erased, leaving the selected function menu only.

Then, the function corresponding to the selected function menu is executed, and, simultaneously with the completion of the execution, the remaining function menu display is also erased. Subsequently, the apparatus is automatically restored to the standby condition in which it is ready to receive another instruction from the photographer with respect to a desired function menu. That is, the apparatus is restored to the initial condition, i.e., the condition prior to the first closing of the E.M switch 34 by the photographer.

Due to the above operations, it is possible for the display, selection and determination of function menus to be conducted only when the photographer desires it; if not desired, it need not be performed at all, which is advantageous from the viewpoint of preventing a malfunction. That is, the menu display is effected only when the photographer desires a function selection and starts a menu selection by closing the E.M switch 34 for the first time.

Figure 7:
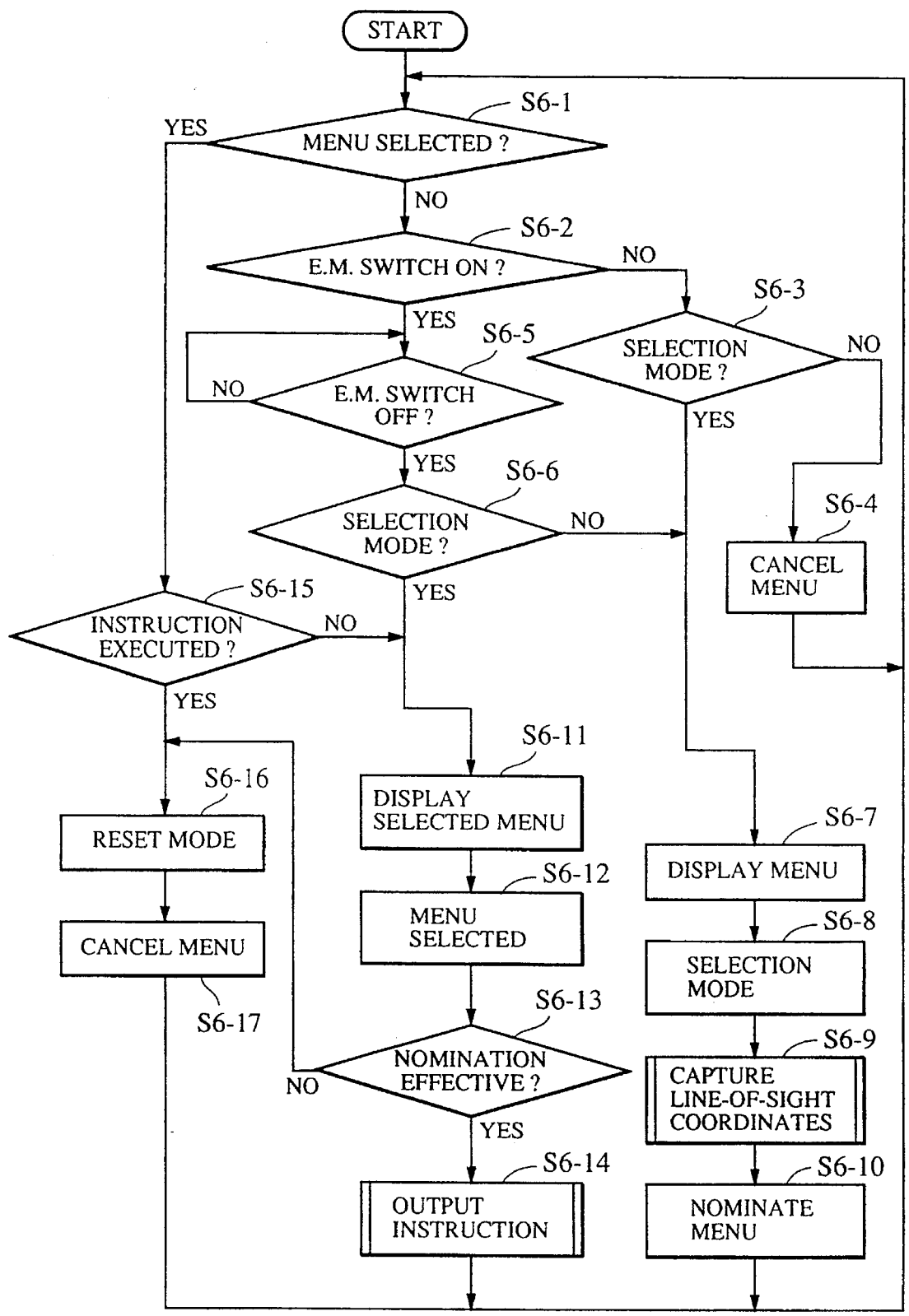
FIG. 7 is a flowchart showing the flow of selection procedures in a selection apparatus according to another embodiment of the present invention.

Next, another embodiment of the present invention will be described with reference to FIG. 7. In this embodiment, the construction of the video camera is the same as that of the above embodiment shown in FIG. 2, so FIG. 2 will be referred to in describing this embodiment. FIG. 7 is a flowchart showing the flow of program operations executed in the central processing unit 15 in the selection apparatus of this embodiment.

Steps S6-1~S6-10, step S6-11, step S6-12, and steps S6-14~S6-17 in FIG. 7 correspond to steps S5-1~S5-10, step S5-12, step S5-13, and steps S5-14~S5-17 in FIG. 6, respectively. FIG. 7 is distinguished from FIG. 6 by the position of the step for judging whether a nominated function menu is valid or not. That is, while in the flowchart of the FIG. 6 step S5-11, for judging whether a nominated function menu is valid or not, is between step S5-6 and step S5-12, step S6-13 for the same judgment in the flowchart of FIG. 7 is between step S6-12 and step S6-14.

According to this embodiment, step S6-13 for judging whether a nominated function menu is valid or not is removed from between step S6-6 and step S6-11. Thus, when the photographer wishes to cancel the function selection mode without designating any function after he has changed the E.M switch 34 from the "closed" to the "open" state to display the function menus on the screen 38, he may gaze at a section of the screen which is other than the function menus in the procedures of steps S6-7 through step S6-10, and change the E.M switch 34 from the "closed" to the "open" state again in steps S6-3 and step S6-6, whereby it is possible for the photographer to intentionally nominate an invalid function menu.

When, after the procedures of steps S6-11 and S6-12, the nominated function is judged to be invalid in step S6-13 the procedure advances to step S6-16, and, in the next step, S6-17, the cancelling of the function selection mode is set, whereby it is possible for the photographer to intentionally cancel the function selection mode without executing any particular function.

If in step S6-13 the nominated function is judged to be valid, an instruction signal is output in step S6-14, as in step S5-14 of FIG. 6 of the above-described embodiment. The process flow in this case is substantially the same as that of FIG. 6.

Next, still another embodiment of the present invention will be described with reference to FIGS. 8 through 11. In this embodiment, the construction of the video camera is the same as that of the embodiment shown in FIG. 2, and the example of the image shown on the monitor of the finder is the same as that of FIG. 5, so FIGS. 2 and 5 will be referred to in describing this embodiment.

Figure 8:
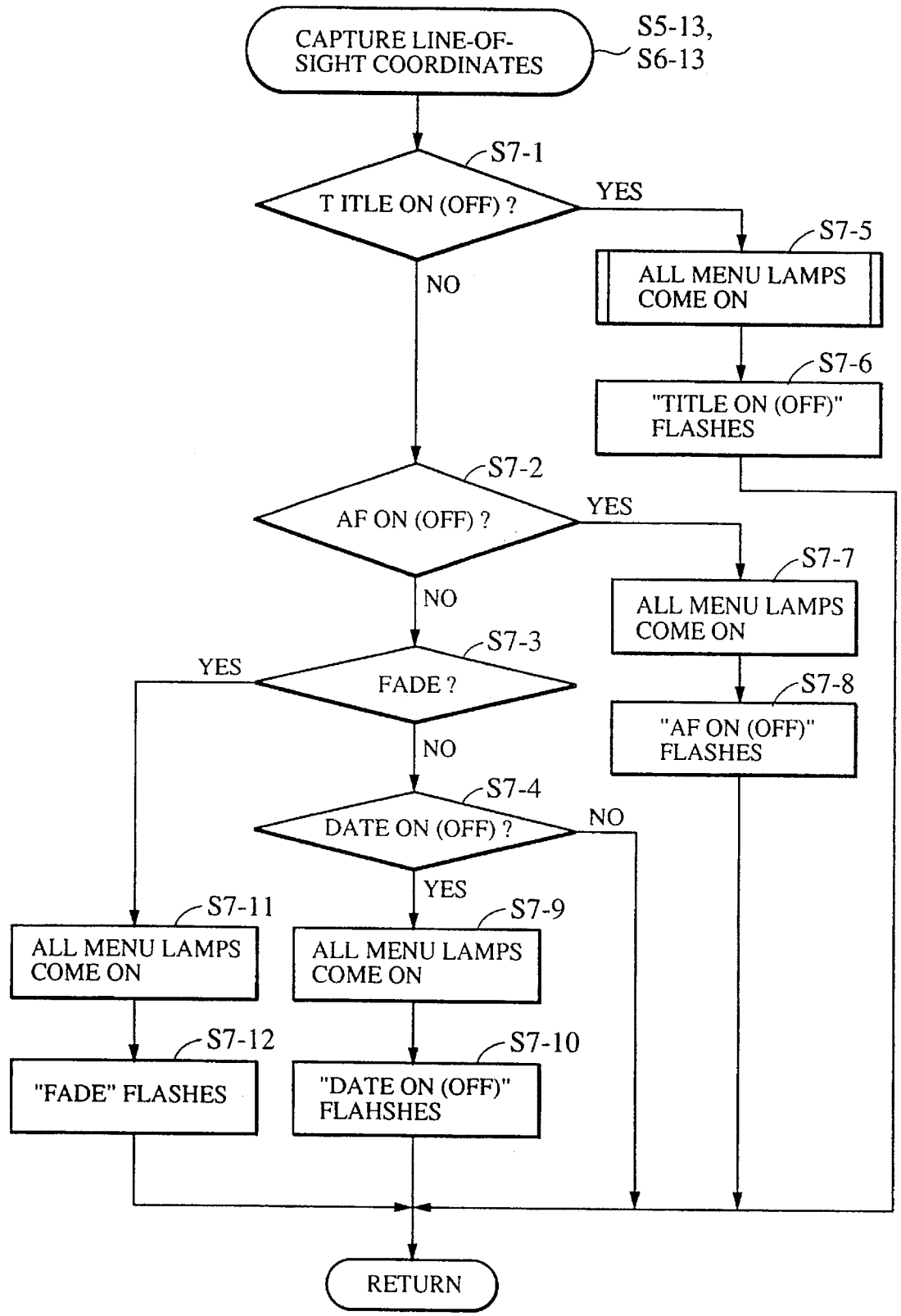
FIG. 8 is a flowchart showing the flow of menu nominating procedures in a selection apparatus according to still another embodiment of the present invention.
Figure 9:
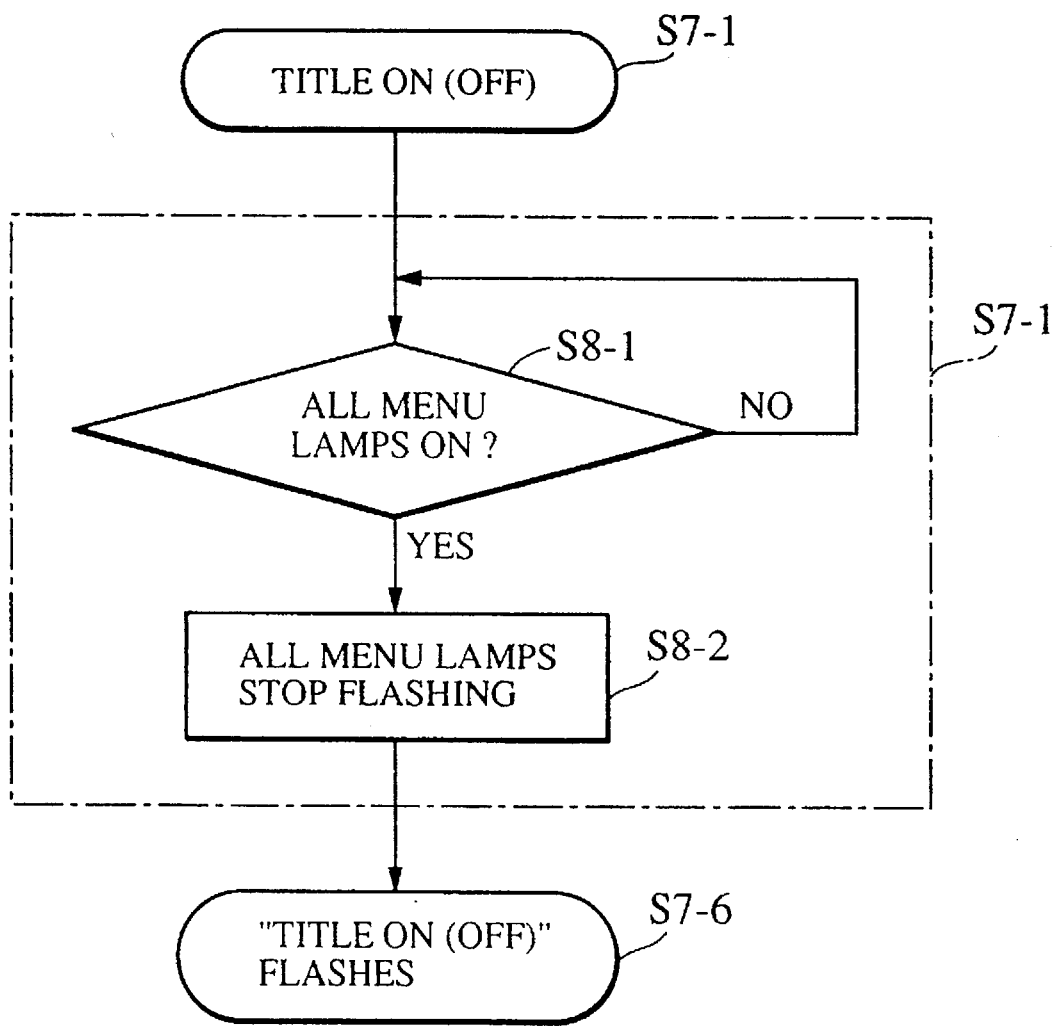
FIG. 9 is a flowchart showing the flow of all menu illuminating procedures in still another embodiment of the present invention.
Figure 10:
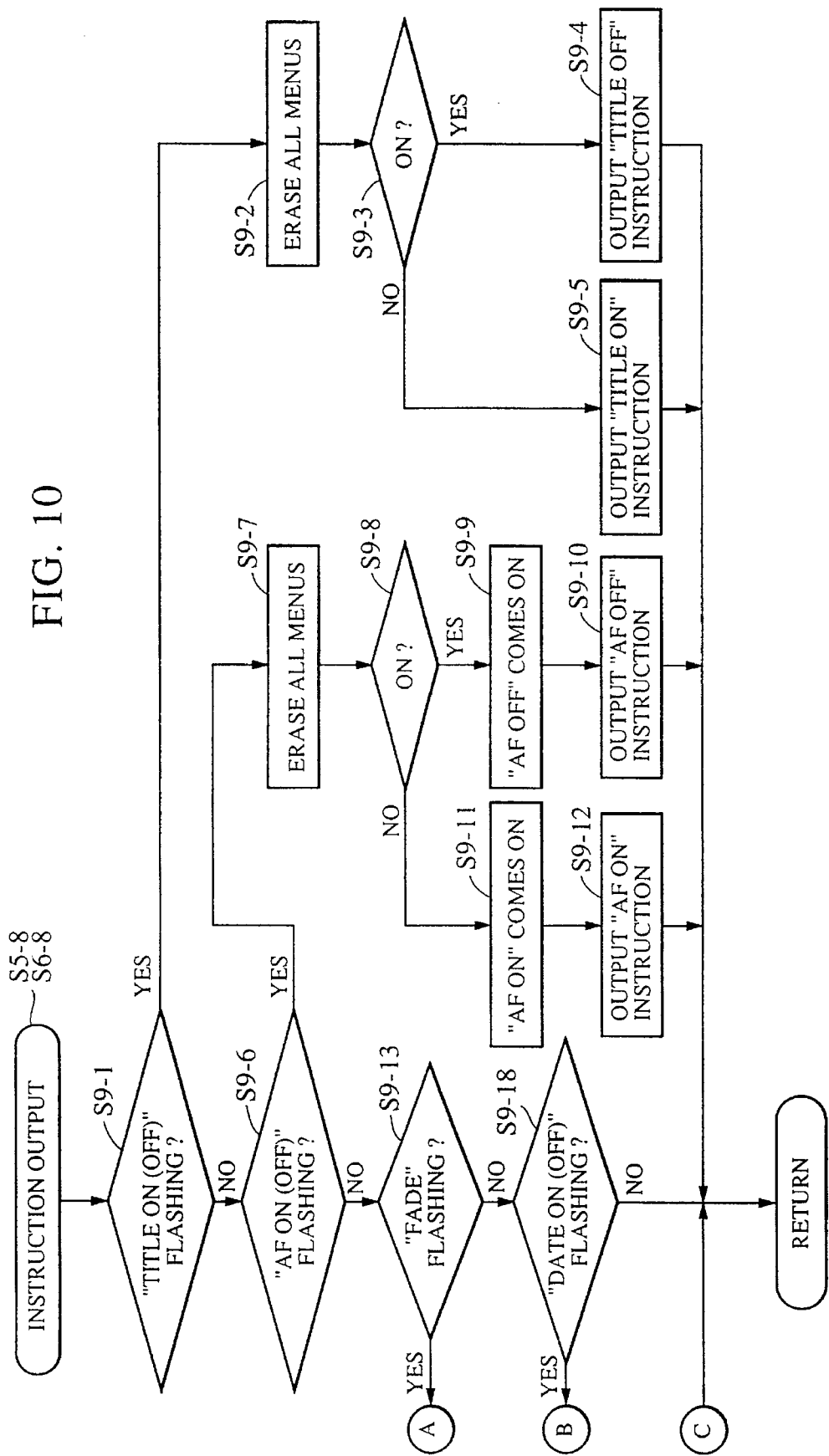
FIG. 10 is a flowchart showing the flow of instruction output procedures in a selection apparatus according to still another embodiment of the present invention.

FIG. 8 is a flowchart showing the flow of procedures for enabling the photographer to check on the progress of the nomination of a function menu, which nomination is executed in steps S5-10 and S6-10 in the case of the above embodiments. FIG. 9 is a flowchart showing in detail an all function menu illuminating process conducted in step S7-5 of FIG. 8. FIG. 10 is a flowchart showing the flow of the instruction signal output procedures in the case where the display system of FIG. 8 is adopted, which signal output procedures are executed in steps S5-14 and S6-14 of FIGS. 6 and 7 in the case of the above two embodiments.

First, assuming that the photographer is gazing at the menu "TITLE ON(OFF)" 41 displayed on the screen 38, as shown in FIG. 5, all the function menus are first illuminated (not flashed) in step S7-5, and then, in the next step, S7-6, only the menu "TITLE ON(OFF)" 41 is flashed. Regarding the function menus that are flash-displayed in steps 5-10 and 6-10 of FIGS. 6 and 7, they are left to keep on flashing when the procedures of steps S5-7 and step S6-7 in FIGS. 6 and 7 are passed through.

The reason for first illuminating all the function menus in step S7-5 will be explained. At the stage where the procedures of steps S5-7~S5-10 or steps S6-7~S6-10 of FIG. 6 or 7 are being executed, the photographer has not designated any particular menu yet, so that he may gaze at any one of various function menus. In this condition, only the function menu that is being gazed at flashes, and the remaining function menus continue to be illuminated. Due to this arrangement, the photographer can ascertain that the function menus are also being recognized by the video camera 11.

In other words, those function menus which are not being gazed at by the photographer must be illuminated. When the photographer gazes at a function menu, and then turns his gaze to another function menu, the first function menu must be changed from the flashed to the illuminated state, and the second function menu must start flashing instead. That is why step S7-5, in which a function menu is switched from the flashing to the illuminated state, has to be provided before the display of a function menu can be changed from the flashed to the illuminated state.

According to FIGS. 6 and 7, the video camera 11 periodically repeats the procedures of steps S5-10 and S6-10 while the photographer is conducting function menus selection. Therefore, step S7-5 of FIG. 8 is periodically passed through. However, if all the menus were to be first illuminated each time step S7-5 is passed through, the period of flashing could not be matched with the timing of illumination in step S7-5 of FIG. 8, resulting in an unnatural flashing. The problem of such an unnatural flashing can be overcome by performing the process to be executed in step S7-5 of FIG. 8 in the manner, for example, shown in FIG. 9.

FIG. 9 is a flowchart showing the flow of the above-described all function menu illuminating procedures to be executed in step S7-5 of FIG. 8. When a particular function menu is flashing exclusively, all the function menus are being illuminated. Thus, in step S8-1 of FIG. 9, the apparatus is held in standby during the flashing period in step S8-1 of FIG. 9, i.e., until all the function menus are illuminated. When all the function menus are illuminated, the procedure advances to step S8-2, where the flashing of all the function menus is inhibited. Thus, if, for example, the procedure of step S7-6 is such that flashing of a menu is started from a non-illuminated state, it is possible to change the function menu to be flashed and to give a flashing display in a natural manner.

To return to FIG. 8, assuming that the photographer is gazing at the "AF ON(OFF)" 42 displayed on the screen 38 in step S7-2, all the function menus are first illuminated (not flashed) in step S7-7, and then, in the next step, S7-8, solely the "AF ON(OFF)" 42 is flashed.

Further, assuming that, in step S7-4, the photographer is gazing at the menu "FADE" 43, displayed on the screen 38, all the function menus are first illuminated (not flashed) in step S7-11, and then, in step S7-12, solely the menu "FADE" 43 is flashed.

Further, assuming that, in step S7-4, the photographer is gazing at the function menu "DATE ON(OFF)" 44, displayed on the screen 38, all the function menus are first illuminated in step S7-9 and then, in step S7-10, solely the menu "DATE ON(OFF)" 44 is flashed.

The function menus "AF ON(OFF)" 42, "FADE" 43, "DATE ON(OFF)" 44 are dealt with in the same manner as in the case of the menu "TITLE ON(OFF)" 41, thereby making it possible to change the flashed function menu and to give a flashing display in a natural manner.

Figure 11:
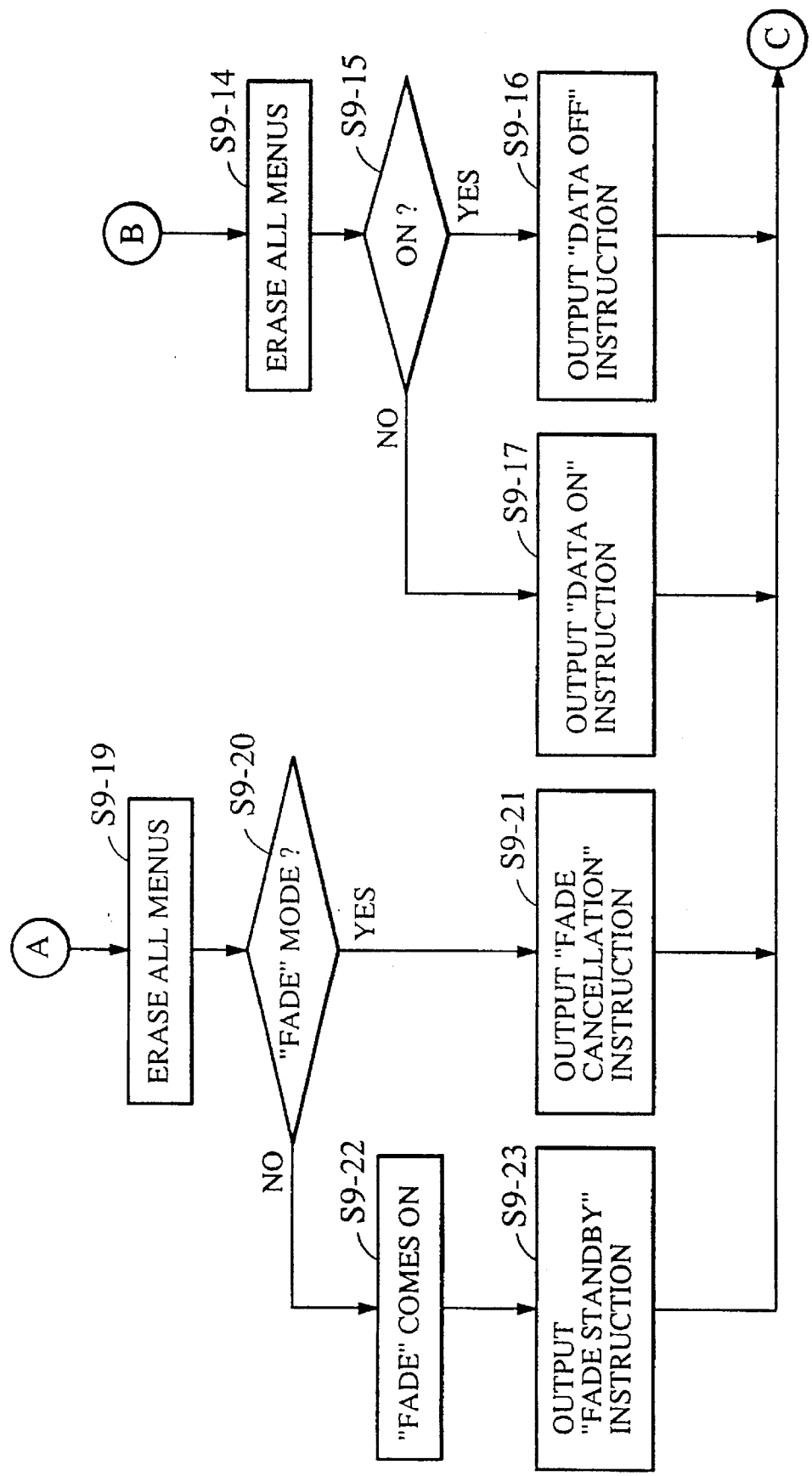
FIG. 11 is a flowchart showing the flow of instruction output procedures in a selection apparatus according to still another embodiment of the present invention.

FIGS. 10 and 11 are flowcharts showing in detail the flow of instruction signal output procedures, which are to be executed in step S6-14 in the case of FIG. 7, where the function menu display system based on the above-described process of FIG. 8 is adopted.

For example, when the function menu "AF ON(OFF)" 42 is flashing, it means that the photographer has changed the E.M switch 34 from the "closed" to the "open" state while gazing at the menu display "AF ON(OFF)" 42, that is, he has designated the menu "AF ON(OFF)" 42. Accordingly, the procedure advances to step S9-7 after passing through the judgment procedures of steps S9-1 and S9-6 of FIG. 10. In step S9-7, all the function menus are first erased. Then, if, in step S9-8, the apparatus is in the "AF ON" state, the procedure advances to step S9-9 so as to bring it to the "AF OFF" state. If the apparatus is in the "AF OFF" state in step S9-8, the procedure advances to step S9-11 so as to bring the apparatus to the "AF ON" state.

The reason for first erasing all the function menus in step S9-7 is to display only that function menu selected by the photographer in step S9-9 or S9-11. In step S9-9, the "AF OFF" is illuminated, and, in the next step, S9-10, an "AF OFF" instruction signal is output. In step S9-11, the "AF ON" is illuminated, and, in step S9-12, an "AF ON" instruction signal is output.

This also applies to the other function menus. However, regarding the function menus "TITLE ON(OFF)" 41 and "DATE ON(OFF)" 44, an explicit display is given as shown in FIG. 5, so that, after erasing all the function menus, the photographer can be sure of the operation results without any special display of the selected function menu. Thus, after the judgment procedures in steps S9-3 of FIG. 10 and S9-15 of FIG. 11 are passed through, instruction signal output procedures are executed in steps S9-4 and S9-5 of FIG. 10 and in steps S9-16 and S9-17 of FIG. 11.

Regarding the function menu "FADE" 43, the fading operation is conducted in synchronism with the operation of a recording-start/standby changeover switch (not shown). That is, when the recording start switch is depressed when the apparatus is in the "FADE" mode, the screen is first whitened before recording is started. Then, the white screen is faded into an actual photographing screen. Similarly, when the recording stop switch is depressed during recording in the "FADE" mode, the actual photographing screen is faded into a white screen to stop the photographing.

Thus, regarding the "FADE" mode, a display on the screen 38 is required in the standby state in which the apparatus is ready for fading, whereas no display is required in the non-standby state in which the photographer wishes no fading after all. Thus, in step S9-22 of FIG. 11, a "FADE" display is given only when a fade standby instruction signal is output; when the fading is cancelled in step S9-21 of FIG. 11, the "FADE" display remains erased.

In the selection apparatuses of the above three embodiments, the apparatus is set to the function selection mode only when the operator wishes function selection; only then, the function menus are displayed. When the apparatus is not in the menu selection mode, the function menus are not displayed. Thus, when the operator does not wish function selection, he is spared the obstruction of the field of view by the menu display. Further, since it is only when the operator wishes to select a function menu that a menu display is given, the operator can easily and efficiently check whether the apparatus has been set to the selection mode or not. Further, a function menu being gazed at by the operator is displayed in a different manner (e.g., flashing) from that in which the remaining function menus are displayed, whereby it is possible for the operator to make sure that his line of sight is in conformity with the recognition by the apparatus, thereby eliminating errors in function menu selection. Further, since the operator communicates the execution instruction for a particular function to the apparatus both by the line of sight and by switch manipulation, it is possible for the operator to cause the apparatus to function in accordance with his or her intentions.

Although the above three embodiments have been described as applied to the video camera 11, which the photographer operates while looking through the finder 12, the present invention is not restricted to this type of video camera. It goes without saying that the technical idea of the present invention is applicable to any apparatus in which the operator selects a desired function from among a plurality of functions while observing an object.

Figure 12:
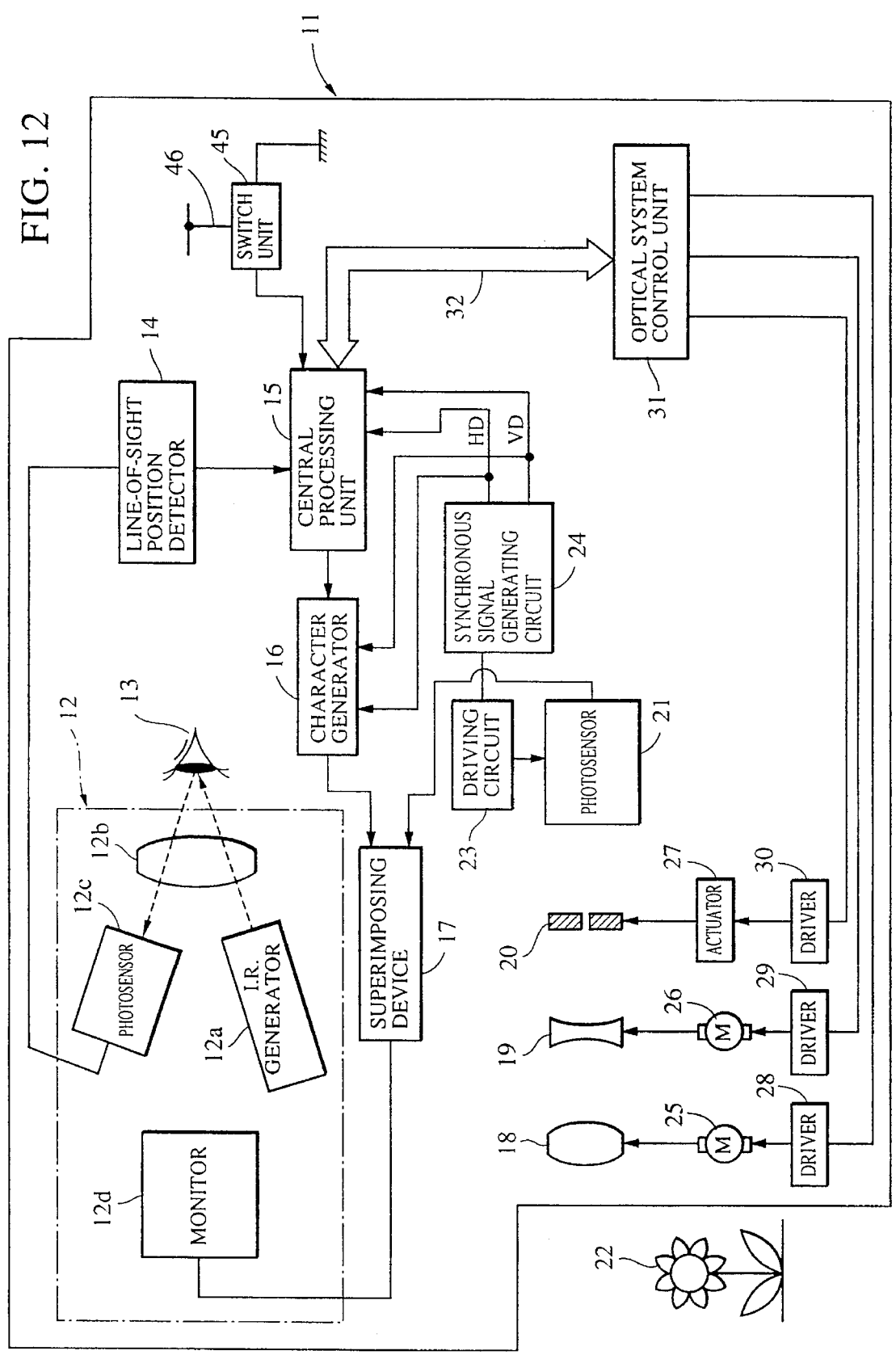
FIG. 12 is block diagram showing the construction of a video camera equipped with a selection apparatus according to still another embodiment of the present invention.

Next, still another embodiment of the present invention will be described with reference to FIGS. 12 through 15. In this embodiment, the components which are the same as those in the above embodiments will be indicated by the same reference numerals. Further, FIG. 5 will be referred to in describing this embodiment. FIG. 12 is a block diagram showing the construction of a video camera equipped with a function selection apparatus according to this embodiment. The construction shown in the drawing differs from that shown in FIG. 1 in that the pull-up resistor 33 and the E.M switch 34 of FIG. 2 are replaced by a switch unit 45 and a line 46 for supplying power source voltage to the switch unit 45.

Figure 13:
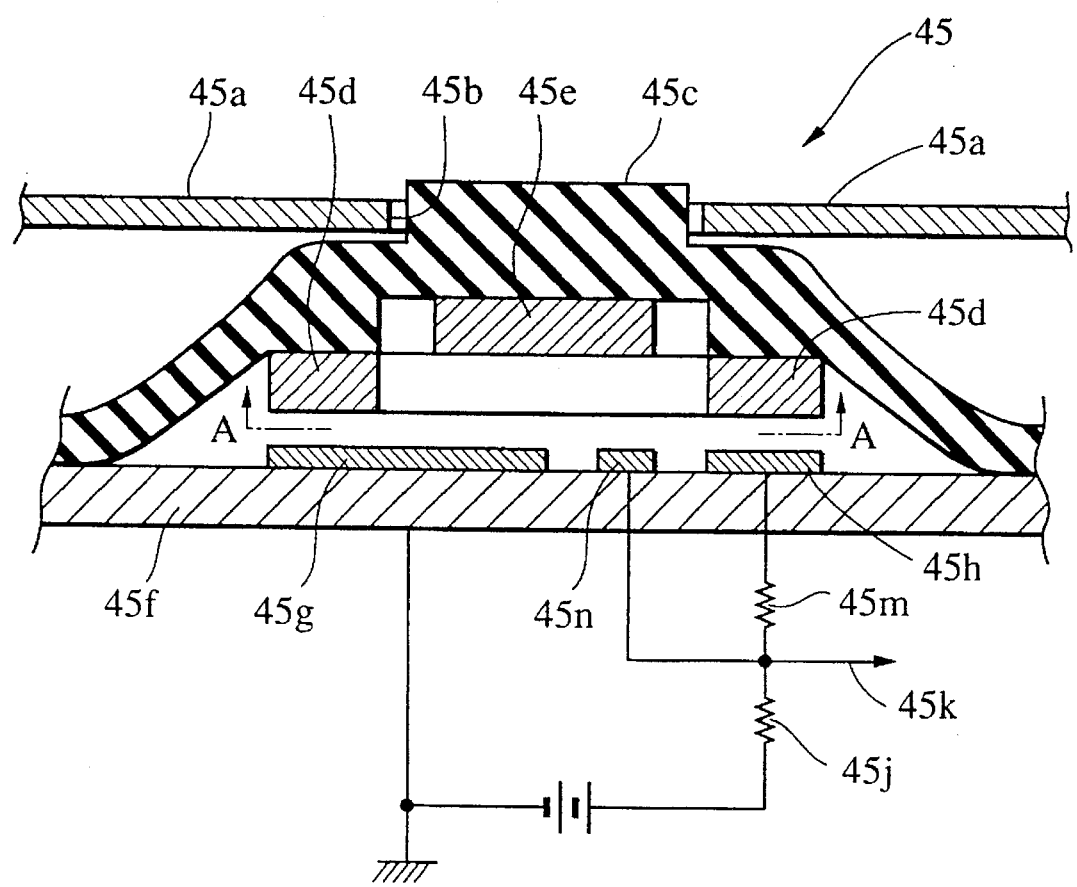
FIG. 13 is a diagram showing the construction of a switch unit in a video camera according to still another embodiment of the present invention.
Figure 14:
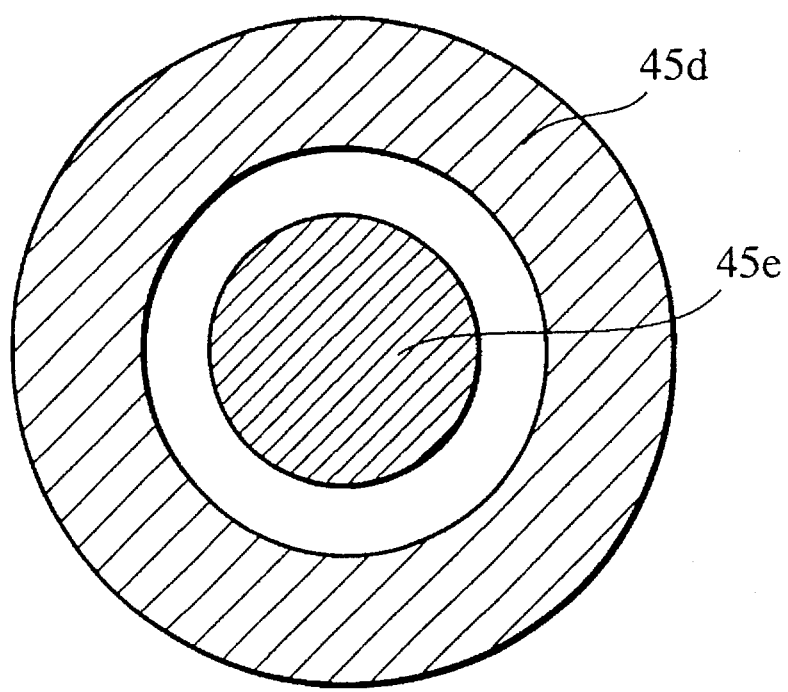
FIG. 14 is a bottom view taken along line A—A of FIG. 13.

The switch unit 45 comprises a push-button switch of a normally open type. As shown in FIGS. 13 and 14, it includes an armor section 45a and a push-button section 45c which is exposed through an opening 45b. First and second conductors 45d and 45e, which are concentrically arranged, are provided on the back side of the push-button section 45c. When the push-button section 45c is lightly depressed by a finger (not shown) of the photographer against its resilient force, the first conductor 45d comes into contact with first and second contacts 45g and 45h which are provided on a base plate 45f, thereby bringing the two contacts 45g and 45h into conduction. This causes the voltage of an output line 45k, which has been pulled up solely by a first resistor 45j, to be changed to a voltage that is divided between the first resistor 45j and a second resistor 45m.

When the push-button section 45c is further, i.e., more deeply, depressed by the finger of the photographer (not shown) against its resilient force, the second conductor 45e comes into contact with the first contact 45g and a third contact 45n, thereby bringing the two contacts 45g and 45n into conduction. This causes the output line 45k to be grounded through the third contact 45n, the second conductor 45e and the first contact 45g.

When the depression of the push-button section 45c by the finger is cancelled, the push-button switch 45c is restored to the initial position by its own resilient force. This causes the two conductors 45d and 45e to be separated from the first through third contacts 45g through 45n to bring the contacts 45g through 45n out of conduction, with the result that the output line 45k is pulled up solely by the first resistor 45j.

Table 1 shows the relationship between the manner in which the push-button section 45c of the switch unit 45 is depressed and the output electric potential of the output line 45k. Here, the relationship is shown on the assumption that the power source voltage is 5 V, and that the values of resistance of the first and second resistors 45j and 45m are the same.

TABLE 1

| Manner of Depression | 45 h/45 g | 45 n/45 g | 45 k output voltage |
|---|---|---|---|
| Untouched | open | open | 5 V |
| Half depressed | closed | open | 2.5 V |
| Fully depressed | closed | closed | 0 V |
| — | open | closed | — |

As can be clearly seen from Table 1, the switch unit 45, which can be shifted in two stages in accordance with the manner in which the push-button switch 45c is depressed, makes it possible to select from three different states with respect to a single output line, 45k. A state in which the first and second contacts 45g and 45h are separated from each other and in which the first and second contacts 45g and 45n are in contact with each other, is impossible in the structure shown in FIGS. 13 and 14. This switch structure enables the photographer to select a desired function menu with his or her line of sight more reliably and more efficiently.

Figure 15:
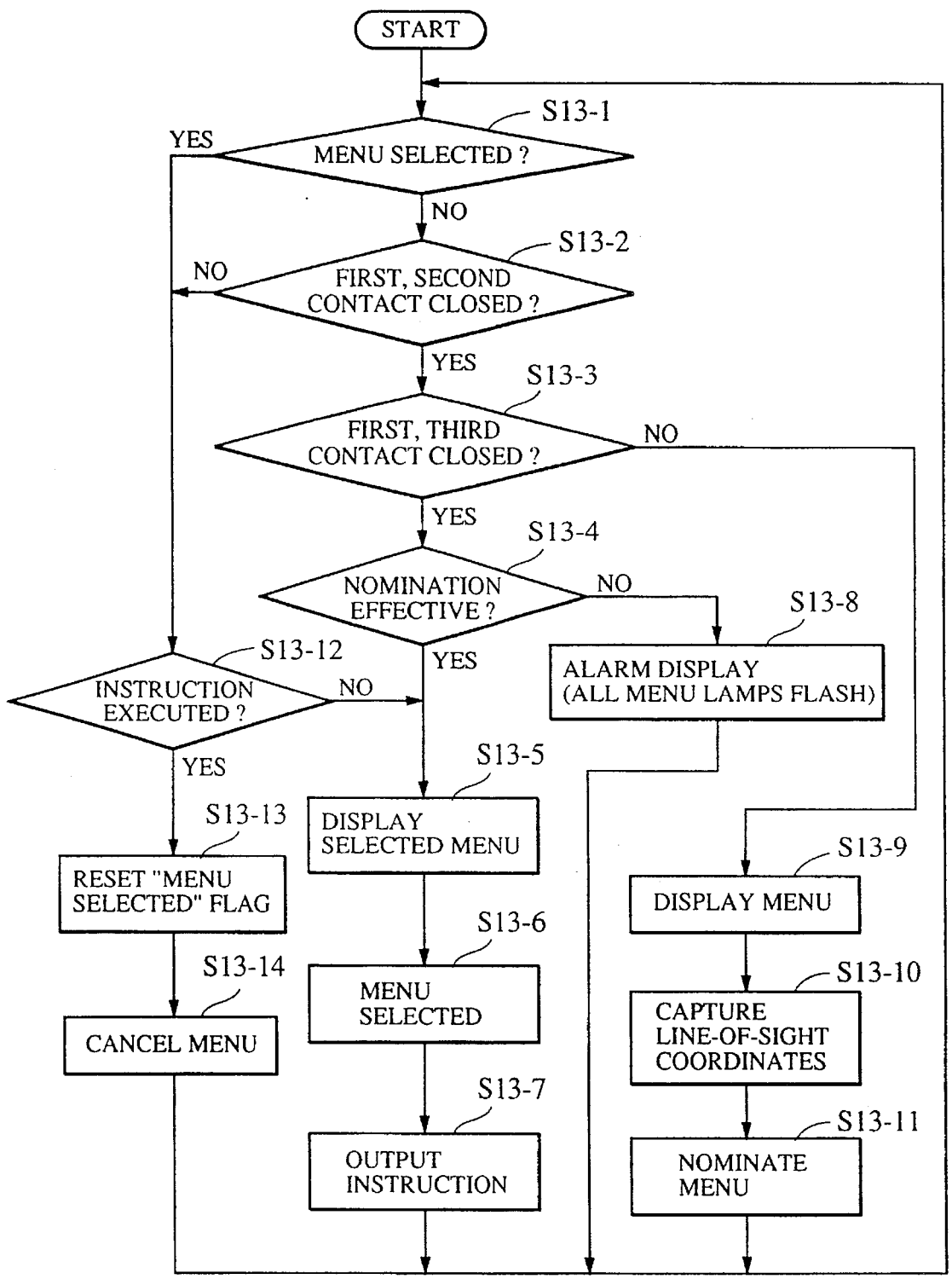
FIG. 15 is a flowchart showing the flow of selection procedures in a selection apparatus according to still another embodiment of the present invention.

FIG. 15 is a flowchart illustrating the flow of procedures by which function menu selection is effected with the line of sight by using the switch unit 45 shown in FIGS. 13 and 14. The procedures are executed in the central processing unit 15. In the drawing, step S13-1, step S13-4~step S13-7, step S13-9, step S13-10, step S13-11, step S13-12 and step S13-14 respectively correspond to step S5-1, step S5-11~step S5-14, step S5-6, step S5-9, step S5-10, step S5-15 and step S5-17 of FIG. 6 executed in the above-described embodiment.

First, in step S13-1, a judgment is made as to whether or not a function menu has already been selected and the execution of the relevant instruction has been started, in accordance with the condition of a "FUNCTION MENU SELECTION" flag. At the time of first judgment, no function menu has been selected yet, so the procedure advances to step S13-2, where a judgment is made as to whether the first and second contacts 45g and 45h are in contact with each other or not. If the first and second contacts 45g and 45h are not in contact with each other, the procedure advances to step S13-3, where the "FUNCTION MENU SELECTION" flag is reset. Then, the function menus displayed on the screen 38 are erased, and the procedure returns to step S13-1, where, when the first and second contacts 45g and 45h are brought into contact with each other, similar procedures are executed.

When it is made sure in step S13-2 that the first and second contacts 45g and 45h are in contact with each other, a judgment is made in the next step, S13-3, as to whether the first and third contacts 45g and 45n are in contact with each other or not. If the first and third contacts 45g and 45n are not in contact with each other, it is determined that the photographer is going to select a function menu displayed on the screen 38 while holding the push-button section 45c of the switch unit 45 half depressed, and the procedure advances to step S13-9, where a function menu display as shown in FIG. 5 is given on the screen 38. Then, relevant line-of-sight coordinates are captured in step S13-10. After this, the function menu corresponding to the relevant line-of-sight position is nominated as a candidate menu to be selected, and then the procedure returns to step S13-1.

When the photographer thus keeps the first and second contacts 45g and 45h in contact with each other by holding the push-button section 45c of the switch unit 45 in the half-depressed state, the procedures of steps S13-1 through S13-3→steps S13-9 through S13-11 are repeated, and, in that time, the photographer can freely select a menu from the menus on the screen 38 with his or her line of sight.

When it is determined in step S13-3 that the first and third contacts 45g and 45n are in contact with each other, a judgment is made in step S13-4 as to whether the nominated function menu is valid or not. That is, a judgment is made as to whether or not the photographer has fully depressed the push-button section 45c of the switch unit 45 while reliably gazing at a particular function menu. If it is uncertain whether or not the photographer has fully depressed the push-button section 45c of the switch unit 45 while gazing at a particular function menu, the nominated function menu is regarded as invalid, and an alarm display (which is given, for example, by flashing all the function menus) is shown in step S13-5 while the photographer continues to hold the push-button section 45c fully depressed. After this, the procedure returns to step S13-1.

In this case, when the photographer releases the push-button section 45c, the function menu selection is entirely cancelled, as described above, in steps S13-13 and S13-14.

When an alarm display is given in step S13-8, the photographer may release the push-button section 45c first and then depress the push-button section 45c again, whereby it is possible for the photographer to perform the function menu selection operation again. The operation of releasing the push-button section 45c and then depressing it again comes quite natural to the photographer. Further, by thus performing the function menu selecting operation again, the photographer is spared the inconvenience of being incapable of re-performing the selection without passing through the registration procedures.

Further, when the push-button section 45c is released from the finger, the procedure advances to the resetting process in steps S13-13 and S13-14 after passing through the procedures of from step S13-8 to steps S13-1 and S13-2, so that, in actual operation, the registration procedures are not passed through when the selection operation is to be performed again. Thus, there is no fear that the wrong function menu may be registered.

When the nominated function menu is judged to be valid in step S13-4, only the selected menu is displayed on the screen 38 in step S13-5. Then, in step S13-6, a "FUNCTION MENU SELECTED" flag is set, and, in step S13-7, an instruction signal is output from the central processing unit 15 to the optical system control unit 31 in accordance with the selected function menu. After this, the procedure returns to step S13-1.

At this stage, the "FUNCTION MENU SELECTED" flag has been set in step S13-6, so the procedure advances from step S13-1 to step S13-2, where a judgment is made as to whether the execution of the instruction has been completed or not. This judgment is possible by communication of the central processing unit 15 with the optical system control unit 31 through the communication path 32. If the execution of the instruction has not been completed yet, the operations of steps S13-5 through S13-7 are performed, and then the procedure returns to step S13-1, where the output of the instruction signal is continued.

When it is determined in step S13-12 that the execution of the instruction has been completed, the "FUNCTION MENU SELECTED" flag is reset and the function menu display is erased through steps S13-13 and S13-14, and then the procedure returns to step S13-1, where the apparatus is set in the standby state in which the photographer is waited for to start another menu selection by depressing the push-button section 45c.

In the selection apparatus of this embodiment, the prior-art function selection switch, which must be operated a plurality of times, is improved such that different outputs can be derived through different manners in which it is operated, whereby the operator can determine easily and reliably what operation he is performing. Further, the apparatus adopts an arrangement in which, unless the switch condition for the n-th operation is satisfied, an (n+1)-th changeover of the switch is not accepted, or in which, when the n-th changeover of the switch is cancelled, the operations from that stage on are all cancelled, and the procedure returns to the (n−1)-th switch operation. Due to this arrangement, when, for example, the cancelling of the function selection mode itself is desired during a series of operations, it is possible to restore the apparatus to the initial state by a single process by bringing it to the condition in which the first switching operation has not been conducted yet (i.e., the condition in which the switch is OFF), whereas, in the prior art construction, which has only one kind of output form, the apparatus can never be restored to the initial state without passing through all the series of operations. Further, due to the switch structure in which the output form is varied according to the manner in which it is depressed, the operator can perform the above plurality of operations solely by depressing a single switch in different manners, whereby it is always possible to discontinue the above operations solely by releasing the switch. Further, the operational complexity is substantially mitigated through a combination of the above function with a function by which the kind of operation being gazed at by the operator and the kind of operation being executed are displayed and a function by which an alarm display is given whenever the operator has operated the apparatus in an inappropriate manner.

Other structural features and operations of this embodiment are the same as those of the above embodiments described above, so a description thereof will be omitted.

Next, still another embodiment of the present invention will be described with reference to FIGS. 16 through 20. Since this embodiment is substantially the same as the above-described ones, FIGS. 5, 6, and 12 through 15 will be referred to in describing this embodiment.

In this embodiment, the following function menu movement registration procedures (1) through (5) can be executed:

(1) When performing the normal switching operation, the same procedures as those of the function menu selection described with reference to FIG. 15 are executed.

(2) When the push-button section 45c of the switch unit 45 is held half depressed for a predetermined period of time, the position of a function menu is moved, making it possible to register the function menu at a new position.

(3) When the operator continues to gaze at the function menu which he or she wishes to move while keeping the push-button section 45c of the switch unit 45 half depressed, the function menu display is presently changed to the display of that function menu only that he is gazing at, and that function menu moves in accordance with the line-of-sight position.

(4) When the operator turns his or her line of sight from the function menu to a desired position, and then the push-button section 45c of the switch unit 45 is fully depressed, the function menu moves to that position.

(5) If some other function menu has already been registered at that position when the push-button section 45c of the switch unit 45 is fully depressed, an alarm display is given by flashing all the registered function menus on the screen 38 of the finder 12.

Figure 16:
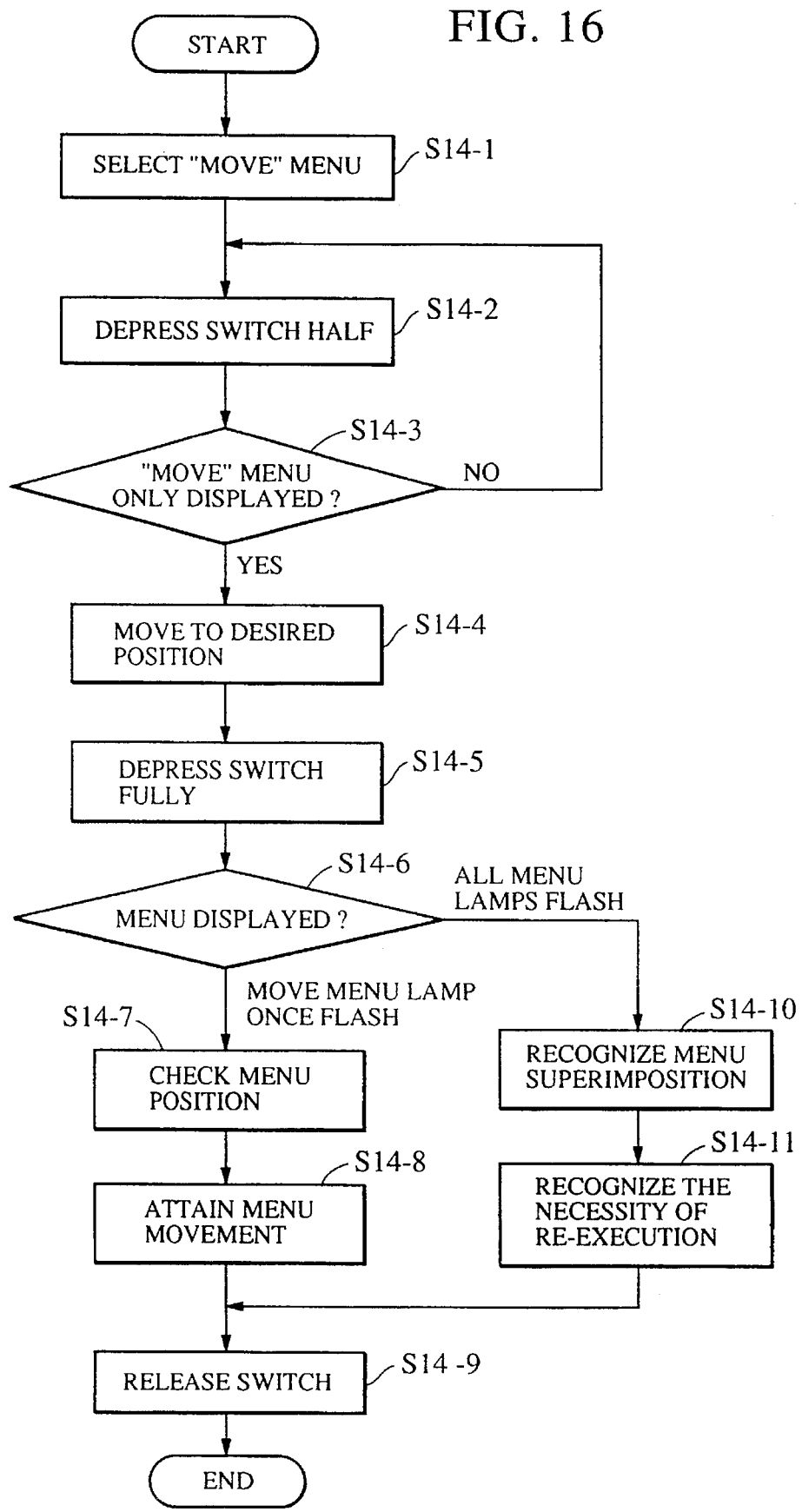
FIG. 16 is a flowchart showing operation procedures to be conducted by the operator in a selection apparatus according to still another embodiment of the present invention.

FIG. 16 is a flowchart showing operation procedures to be conducted by the photographer. In step S14-1 of the drawing, the photographer selects the menu to be moved while watching the display of FIG. 5. When the selection has been completed, the photographer continues, in step S14-2, to gaze at the function menu thus selected while lightly depressing the push-button section 45c of the switch unit 45 shown in FIGS. 13 and 14, and remains in standby in this state until the function menu display is changed to that of the selected function menu only. When the display is changed to that of the selected function menu only, the function menu moves with the line-of-sight position, so that, in step S14-4, the function menu moves to the desired position, and, in step S14-5, the push-button section 45c is fully depressed.

Next, if, upon checking the function menu display in step S14-6, all the function menus displayed in FIG. 5 are found to be flash-displayed, it means that some other menu has already been registered at the destination of movement of the above function menu. Thus, the position and type of the already-registered function menu is checked in step S14-10, and in the next step, S14-11, the necessity of re-doing the above process is recognized. Then, in step S14-9, the operator releases the push-button section 45c to terminate or re-do the processing.

If, in step S14-6, the function menu to be moved is displayed through a single flash, it means that the movement of the function menu has been achieved, so the position of the function menu is ascertained in step S14-7, to make sure, in step S14-8, that the function menu has been successfully moved. Then, in step S14-9, the push-button section 45c is released to terminate the process.

Figure 17:
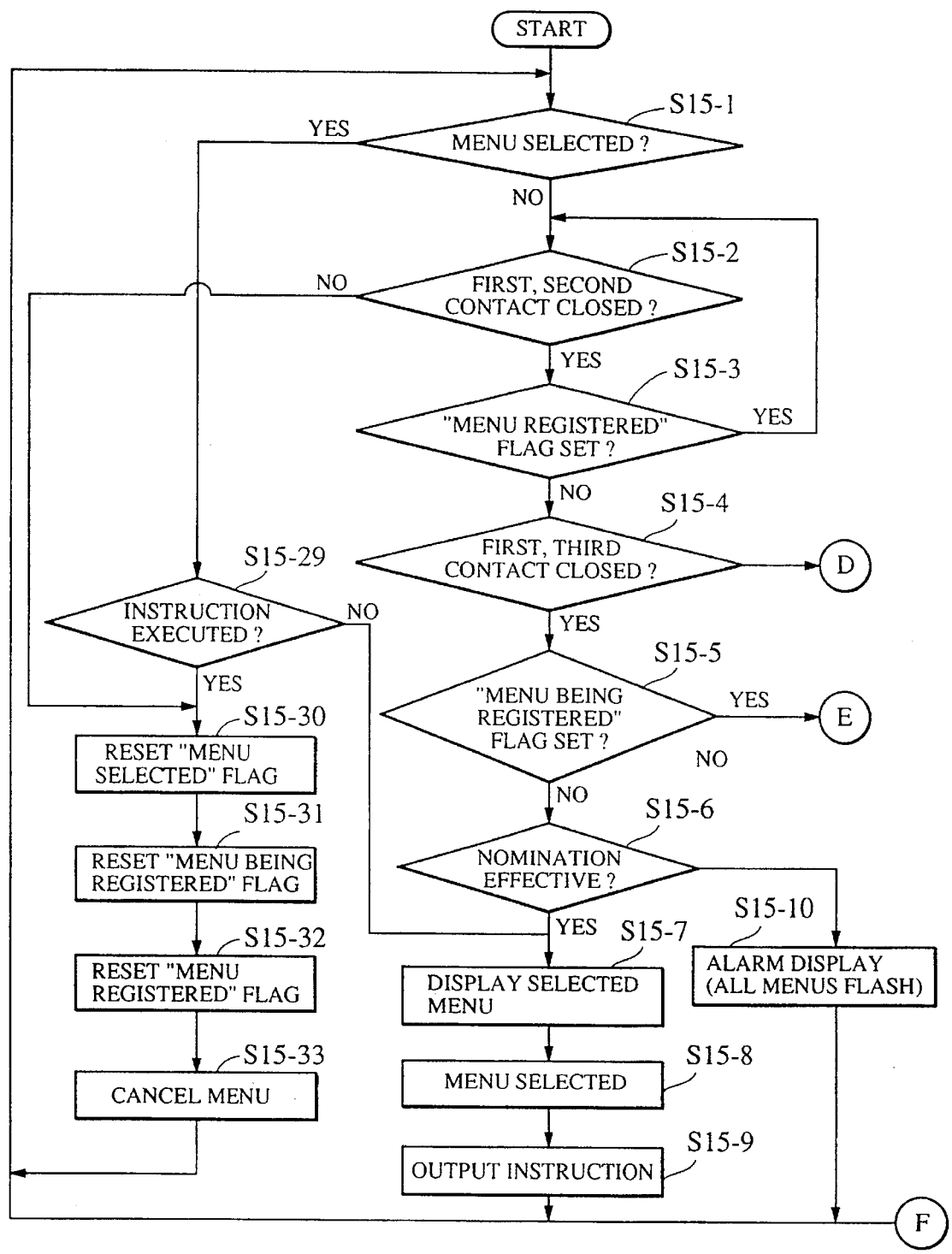
FIG. 17 is a flowchart showing operation procedures to be conducted by the operator and specific methods for executing various processes in the selection apparatus.
Figure 18:
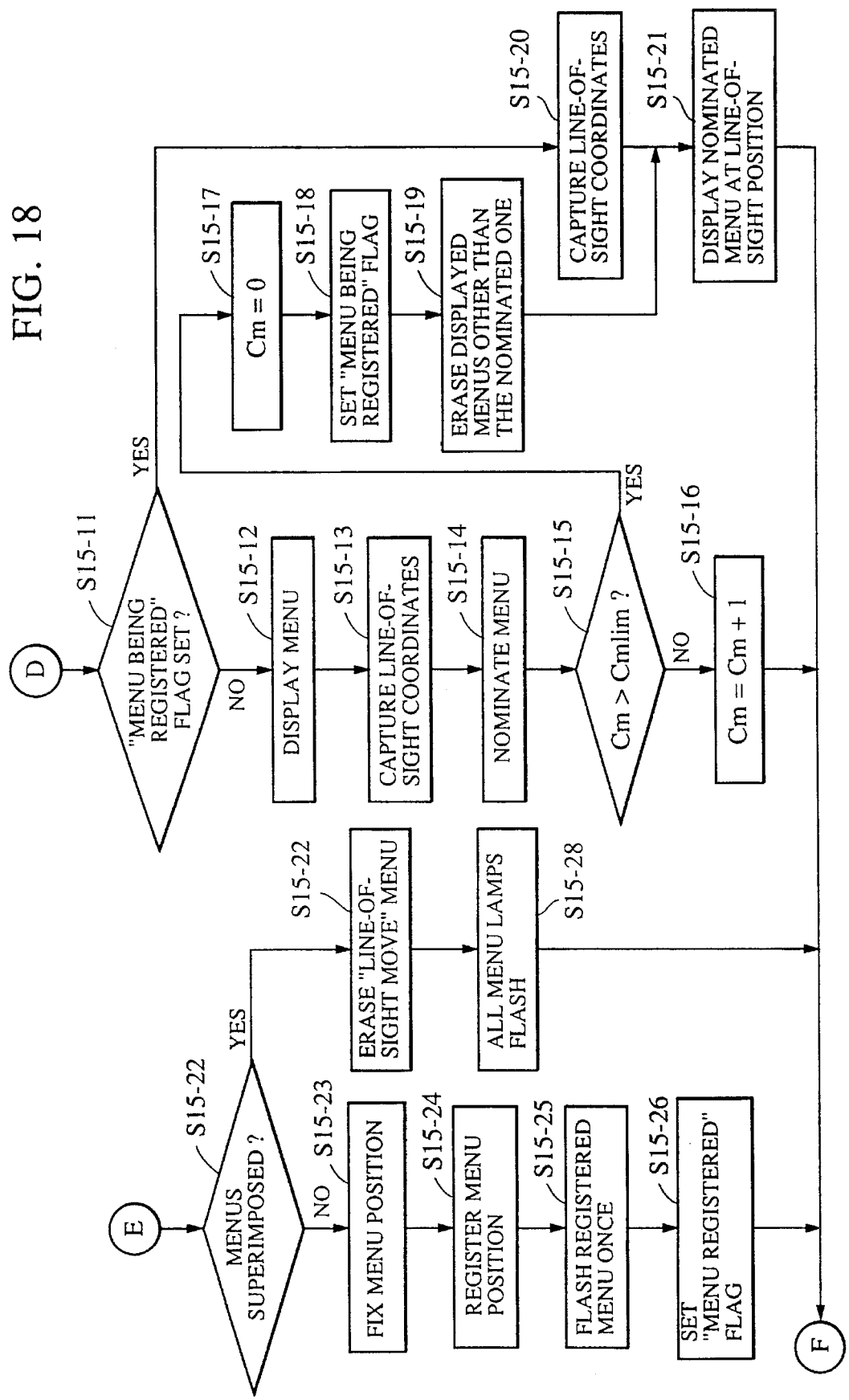
FIG. 18 is a flowchart showing operation procedures to be conducted by the operator and specific methods for executing various processes in the selection apparatus.

FIGS. 17 and 18 are flowcharts illustrating function menu selection procedures using the switch unit 45 shown in FIGS. 13 and 14. As in the case of FIG. 15, the procedures of these flowcharts are executed in the central processing unit 15, and the switch used in the setting of function menus is the switch unit 45 shown in FIGS. 13 and 14, i.e., the switch which gives different output forms according to the manner in which the push-button section 45c is depressed.

In step S15-1 of FIG. 17, a judgment is made as to whether or not a function menu has been selected and the relevant function has been executed (i.e., whether the apparatus is in the "FUNCTION MENU SELECTED" state). If it is determined that no function menu has been selected yet, a judgment is made in step S15-2 as to whether the push-button section 45c of the switch unit 45 is being lightly depressed or not. If the push-button section 45c is being lightly depressed, the procedure advances to step S15-3, where a judgment is made as to whether a series of function menu registering operations, which constitute the main feature of this embodiment, have been completed and whether the photographer has released the push-button section 45c or not.

When the series of function menu registering operations have been completed, the "light depression" of the push-button section 45c is detected, with the "FUNCTION MENU REGISTERED" flag set, so that the procedure returns to step S15-2 without executing any further operation until the push-button section 45c is released.

When the function menu registering operations have not been completed yet, a judgment is made in step S15-4 as to whether the push-button switch section 45c is being fully depressed by the photographer or not. When the push-button section 45c is not being fully depressed, it is determined that the photographer is performing the function menu selection described with reference to FIG. 15 or is going to register a function menu, and the procedure advances to step S15-11. In step S15-11, a judgment is made as to whether a "FUNCTION MENU BEING REGISTERED" flag is set or not. From the result of this judgment, it is determined whether the function menu selection is being performed or not.

If it is determined in step S15-11 that the "FUNCTION MENU BEING REGISTERED" flag is not set, the procedure advances to step S15-12, where a function menu display as shown in FIG. 5 is given. Then, in step S15-13, the position of the photographer's line of light is detected and captured as two-dimensional coordinates.

Figure 19:
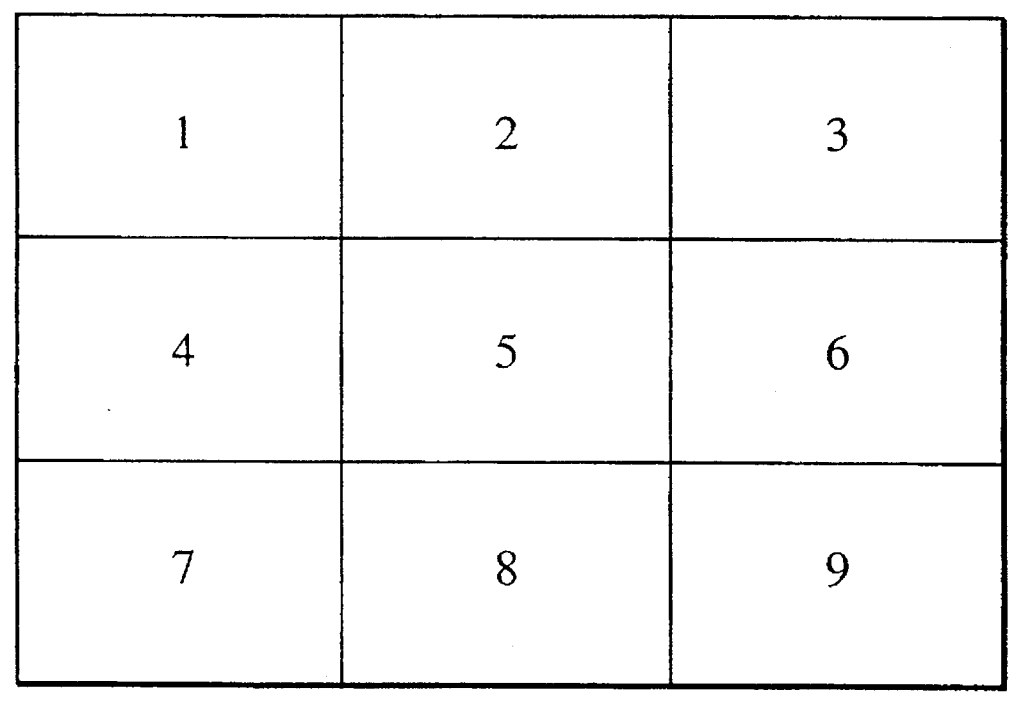

FIG. 19 shows an example of the method of capturing the line-of-sight position, according to which the entire screen 38 is divided into nine areas 1 through 9, and a judgment is made as to which of these areas the line of sight of the photographer is directed. Then, in step S15-14 of FIG. 18, the function menu corresponding to the position of the line of sight is nominated as a candidate, and the procedure advances to step S15-15.

So far, the procedures are basically the same as those for the function menu selection described above with reference to FIG. 15. The correspondence between the line-of-sight position and the function menu is as follows: for example, when the line-of-sight position is in area 1 of FIG. 19, the function menu "TITLE ON/OFF" is selected as a candidate from the table shown in FIG. 20.

To return to FIG. 18, in step S15-15, a judgment is made as to whether the value of a counter Cm has exceeded a threshold value Cmlim or not. If not, the value of the counter Cm is incremented in step S15-16, and then the procedure returns to step S15-1. Thus, unless the value of the counter Cm exceeds the threshold value Cmlim, the operation when the push-button section 45c is lightly depressed is the same as the function menu selecting operation of FIG. 15.

As long as the push-button section 45c is kept half depressed, the procedure circulates through the loop: step S15-1~step S15-4 of FIG. 17→step S15-11~step S15-16 of FIG. 18.

When, with the passage of time, the value of the counter Cm exceeds the threshold value Cmlim, the procedure advances to step S15-17, where the value of the counter Cm is reset to 0. Then, it is determined that the function menu registering operation has started, and the "FUNCTION MENU BEING REGISTERED" flag is set in step S15-18. Then, the procedure advances to step S15-19, where only the function menu nominated in step S15-14, i.e., the function menu at which the photographer has been gazing while keeping the push-button section half-depressed, is displayed, and the display of the other function menus is erased.

Then, the procedure advances to step S15-21, where the function menu left in step S15-19 is displayed at the position of the photographer's line of sight (the position where the line-of-sight coordinates were captured in step S15-13 following step S15-12, step S15-21 having been reached for the first time through step S15-17). After this, the procedure returns to step S15-1 of FIG. 17.

Assuming that the photographer is still holding the push-button section 45c half-depressed at this time, the procedure advances through the loop of step S15-1~step S15-4 of FIG. 17 to reach step S15-11 of FIG. 18. Since the "FUNCTION MENU BEING REGISTERED" flag has been set in step S15-11, the procedure advances to step S15-20, where the line-of-sight coordinates are captured. Then, in step S15-21, the nominated function menu is displayed at the position indicated by the line-of-sight coordinates obtained in step S15-20, and the photographer shifts his or her line of sight while lightly depressing the push-button section 45c. Then, as the procedure circulates through the loop: step S15-1~step S15-4 of FIG. 17~step S15-11→step S15-20→step S15-21 of FIG. 18, the nominated function menu changes its position of display, as in the case of the function menu "FADE" 43 shown in FIG. 21, which moves as follows: position A→position B→position C→position D.

Figure 21:
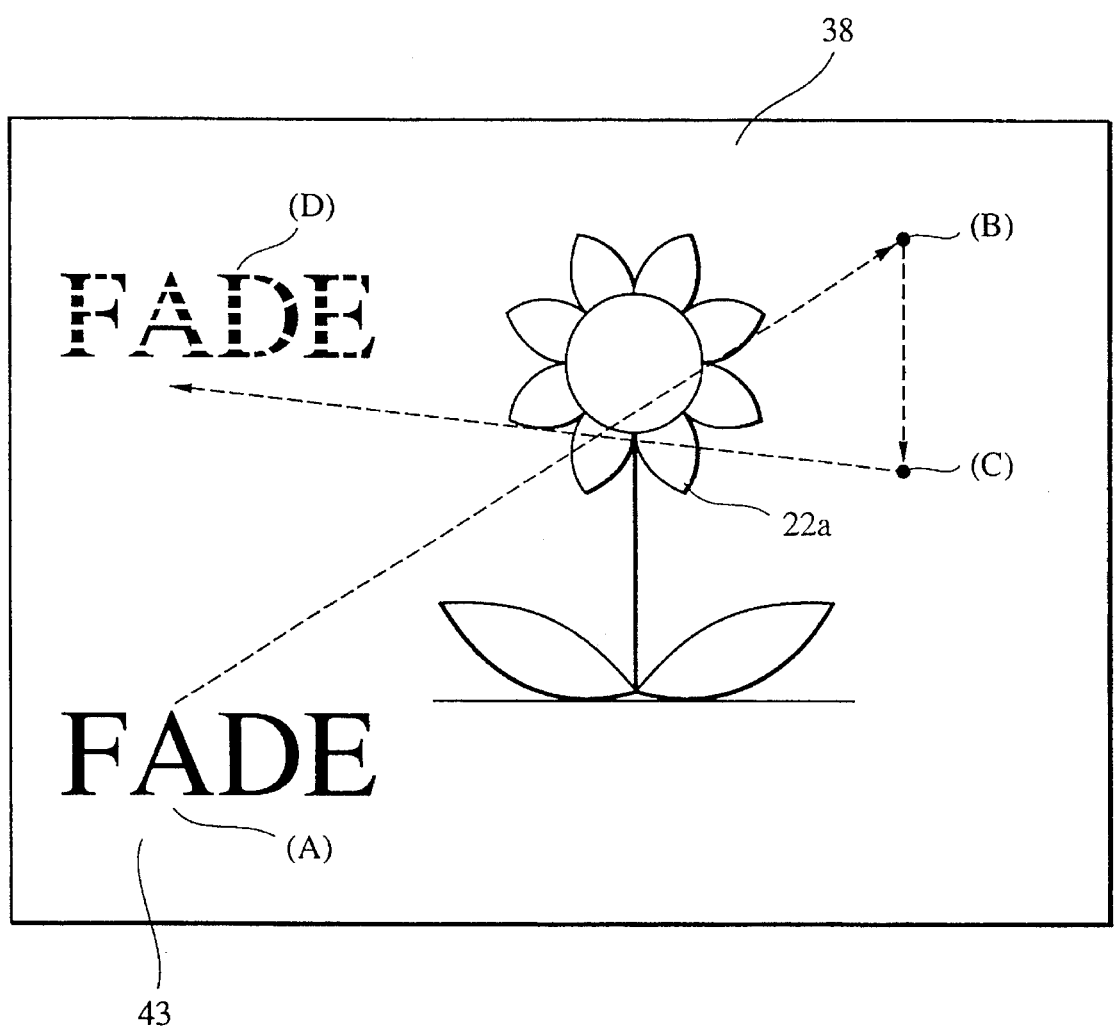
FIG. 21 is a diagram showing an example of the movement of function menus displayed on a monitor screen in a finder of a selection apparatus.

When the photographer moves the menu "FADE" 43 to, for example, position D of FIG. 21, and then fully depresses the push-button section 45c, the procedure advances from step S15-4 to step S15-5 of FIG. 17. In step S15-5, a judgment is made as to whether the "FUNCTION MENU BEING REGISTERED" flag is set or not. If not, the procedures of step S15-6~step S15-10, similar to those of step S13-4~step S13-8 of FIG. 15, are executed. When the "FUNCTION MENU BEING REGISTERED" flag is set, the procedure advances from step S15-5 to step S15-22 of FIG. 18.

That the photographer has fully depressed the push-button section 45c means that he or she is going to move the function menu to the position of the line of sight, so, in step S15-22, a judgment is made as to whether there is already any other function menu at the position to which the photographer wishes to move the function menu. As stated above, the line-of-sight coordinates are given in the form of areas 1 through 9 as shown in FIG. 19. By providing a table as shown in FIG. 20 in the central processing unit 15, it can be easily checked whether there is a function menu in any of areas 1 through 9.

When a superimposition of function menus is detected in step S15-22, the procedure advances to step S15-27, where the nominated function menu, which has been following the movement of the photographer's line of sight, is erased. Instead, in step S15-28, all the function menus stored in the table of FIG. 20 are flash-displayed at the relevant position to give an alarm to the photographer. Further, the photographer is called upon to check the kind and position of the function menu already registered. After this, the procedure returns to step S15-1 of FIG. 17.

When no superimposition of function menus is detected in step S15-22, the procedure advances to step S15-23, where the function menu which has been changing its position in accordance with the line-of-sight position is fixed to the position of the photographer's line of sight. In the next step, S15-24, the function menu stored in the table of FIG. 20 is changed. When the menu changing process has been completed in the normal manner, the newly registered menu is flashed once in step S15-25 to inform the photographer of the completion of the function menu registration, and, in step S15-26, the "FUNCTION MENU REGISTERED" flag is set.

After this, the procedure returns to step S15-1, and, when the photographer releases the push-button section 45c, believing that the registration of the function menu registration has been completed, the procedure advances from step S15-2 to step S15-30. In step S15-30, the "FUNCTION MENU SELECTED" flag is reset; in step S15-31, the "FUNCTION MENU BEING REGISTERED" flag is reset: and, in step S15-32, the "FUNCTION MENU REGISTERED" flag is reset. Then, in step S15-33, the function menu is cancelled, and then the procedure returns to step S15-1.

When the photographer continues to keep the push-button section 45c depressed after the completion of the registration of the function menu, the procedure moves from step S15-2 to step S15-3, where a judgment is made as to whether the "FUNCTION MENU REGISTERED" flag is set or not. If it is set, the procedure returns to step S15-2. Due to this arrangement, the function menu registering operation is started anew even when the photographer continues to keep the push-button section 45c depressed after the registration of the function menu, thereby preventing the same function menu from being erroneously re-registered.

When, in step S15-1, the function menu has already been selected, the procedure advances to step S15-29, where a judgment is made as to whether the execution of the relevant instruction has been completed or not. If it has been completed, the procedure advances to step S15-30; if not, the procedure advances to step S15-7.

By executing the above processes, it is possible to execute the above-described function menu movement registration procedures (1) through (5).

Next, still another embodiment of the present invention will be described with reference to FIGS. 22 through 27.

In this embodiment, the following procedures (1)–(6) can be performed:

(1) When the normal switch operation is to be conducted, the same steps as those of the function menu selecting operation described with reference to FIGS. 6 and 15 are taken.

(2) When the photographer remains in standby for a predetermined period of time while keeping the push-button section 45c of the switch unit 45 half-depressed, it becomes possible for him to register an arbitrary new function menu he or she desires at an arbitrary position.

(3) When the photographer remains in standby for a while, keeping the push-button section 45c of the switch unit 45 half-depressed, the display of all the function menus are presently erased, leaving only a marker which is indicative of the line-of-sight position, which marker follows the movement of the line-of-sight position.

(4) When the photographer moves the marker to a desired position by means of his or her line of sight, and depresses a function button (e.g., the zoom TELE button) while holding the push-button section 45c of the switch unit 45 fully depressed, the function menu corresponding to the function button (e.g., "TELE") is displayed at that position.

(5) If some other function menu has already been registered at that position when the push-button section 45c of the switch unit 45 is fully depressed, all the registered function menus are flash-displayed on the screen 38 of the finder 12 to give an alarm.

(6) In some cases, cancelling of a function menu is desired so as to prevent a malfunction due to erroneous function menu gazing, etc. In such cases, the photographer fully depresses the push-button section 45c of the switch unit 45 without depressing the function button, whereby the display of the function menu designated by the line of sight can be erased.

Figure 22:
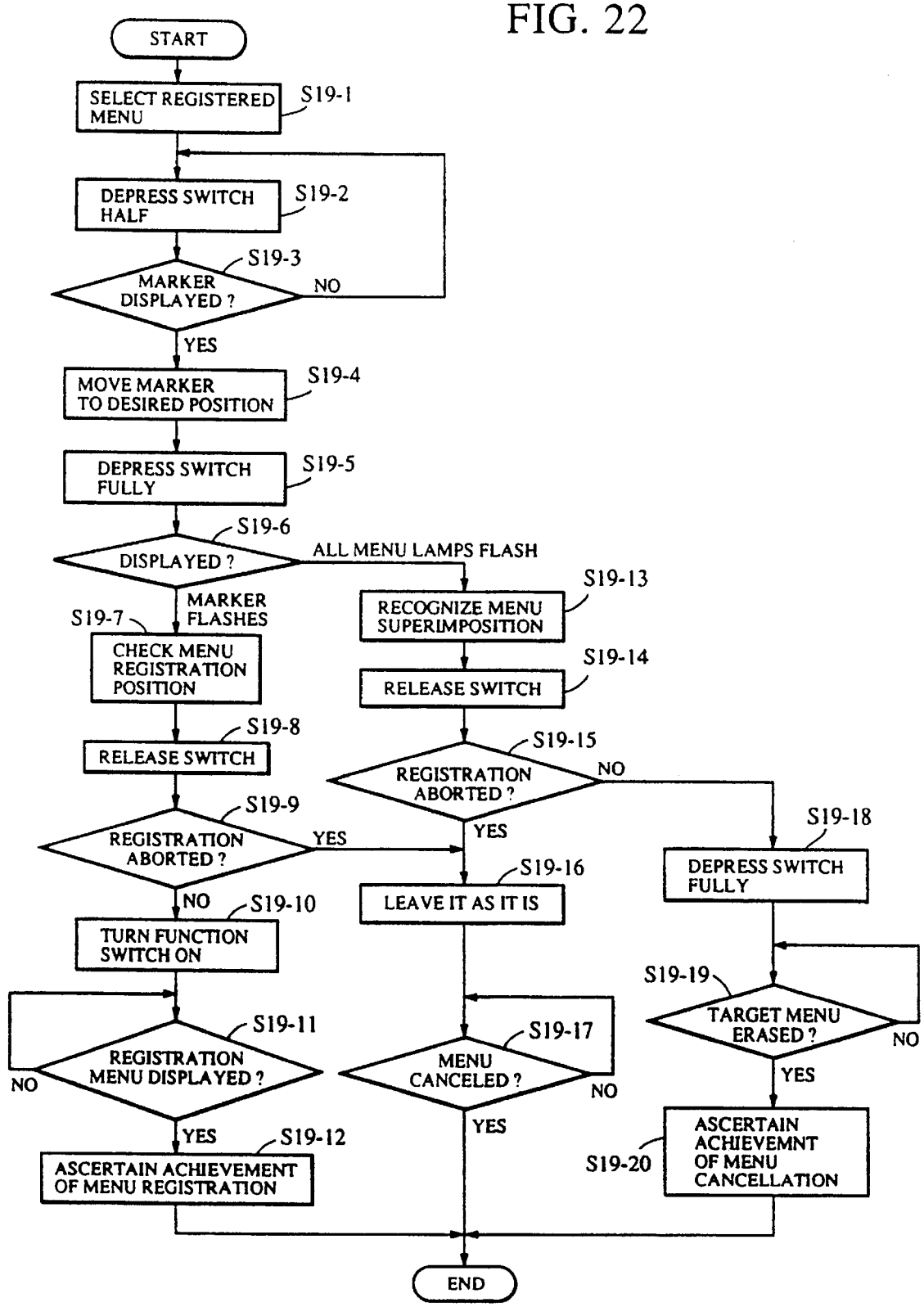
FIG. 22 is a flowchart showing operation procedures to be conducted by the operator in a selection apparatus according to still another embodiment of the present invention.

FIG. 22 is a flowchart showing operation procedures to be conducted by the photographer. In step S19-1 of the drawing, a function menu to be newly registered is selected. The "function menu to be newly registered" means a function menu which is not registered in a table similar to FIG. 21 and which represents a function that is equivalent to those of the function switches shown in FIG. 27.

In the next step, S19-2, the push-button section section 45c of the switch unit 45 shown in FIGS. 13 and 14 is lightly depressed, and, in the next step, step S19-3, the function menu display shown in FIG. 4 is erased, and the photographer remains in standby until a marker 56 like "*", which follows the movement of the line-of-sight position (see FIG. 26) is displayed on the screen 38 of the monitor 12d of the finder 12 shown in FIG. 11. When the marker 56 is displayed, the procedure advances to step S19-4, where the marker 56 is moved to the position where the photographer wishes to register the function menu, and, in step S19-5, the push-button section 45c of the switch unit 45 is fully depressed.

Then, the procedure advances to step S19-6, where the contents of the display on the screen 38 of the monitor 12d are checked. If, at this time, all the registered function menus are being flash-displayed, it means that some other function menu had already been registered at the position of the marker 56, so that the procedure advances to step S19-13, where this fact is ascertained. Then, in step S19-14, the push-button section 45c of the switch unit 45 is released.

After this, a judgment is made in step S19-15 as to whether the function menu registration is to be suspended or not. If it is to be suspended, the procedure advances to step S19-16, where no further step is taken in this regard, and, in step S19-17, a judgment is made as to whether the function menu registration has been cancelled or not. If it has not been cancelled, the procedure returns to step S19-16. When the function menu display ceases to be shown on the screen 38 of the monitor 12d, it means that the function menu registration has been cancelled, so the operation is terminated.

When it is determined in step S19-15 that the function menu registration is not to be suspended, that is, when it is determined that the function menu registration is to be cancelled, the procedure advances to step S19-18, where the push-button section 45c of the switch unit 45 is fully depressed again. Then, the function menu which had been registered at the position of the marker 56 is cancelled. Of the function menus flash-displayed, only that function menu which is at the position of the marker 56 is erased, so that, in step S19-19, it is repeatedly checked whether the target function menu has been erased or not until it is actually erased. When the function menu has been erased, it is ascertained in step S19-20 that the function menu has been cancelled, with which this operation is terminated.

When, in step S19-6, the marker 56 is flash-displayed, it means no function menu is registered at that position, so that a function menu can be newly registered. Thus, after the position of registration of the function menu (the position of the marker 56) is checked in step S19-7, the push-button section 45c of the switch unit 45 is released in step S19-8. After this, the procedure moves to step S19-19, where a judgment is made as to whether the function menu registration is to be suspended or not. If it is to be suspended, the procedure passes successively through steps S19-16 and S19-17 to terminate the operation.

If it is determined in step S19-19 that the function menu registration is not to be suspended but that a function menu is to be registered anew, the procedure advances to step S19-10, where the function switch corresponding to the function menu selected in step S19-1 is turned on, and, in the next step, S19-16, a judgment is repeatedly made as to whether the selected function menu has been displayed on the screen 38 of the monitor 12d or not until the display is actually shown. When the selected menu is displayed on the screen 38 of the monitor 12d, the procedure advances to the next step, S19-12, where it is ascertained that the registration of the new function menu has been completed, with which this operation is terminated.

When all the registered function menus are being flash-displayed, it means that some other function menu is registered at the position of the marker 56, which is ascertained in step S19-13, and, in step S19-14, the push-button section 45c is released. After this, if it is determined in step S19-15 that the function menu registration is to be suspended, the procedure advances to step S19-16, where no further step is taken in this regard, and, if, in the next step, S19-17, no function menu display is shown, it means that the function menu registration has been cancelled, so the operation is terminated.

Next, the above procedures (1) through (6) and the operation of FIG. 22 will be described in detail with reference to FIGS. 23 through 25. As in the case of FIGS. 15, 17 and 18, the procedures of the drawings are executed in the central processing unit 15. The switch used for function menu setting is the switch unit 45 which is shown in FIGS. 13 and 14, which switch unit provides different output modes according as how the push-button section 45c is depressed.

In step S20-1 of FIG. 23, it is checked whether a "POSITION REGISTERED" flag, which will be described below, is set or not. When the "POSITION REGISTERED" flag is not set, a function menu is selected in step S20-2, and a judgment is made as to whether the function is being carried out (whether the function menu has been selected) or not. When the function menu has not been selected yet, a judgment is made in step S20-3 as to whether the push-button section 45c has been lightly depressed or not. When the push-button section 45 has been lightly depressed by the photographer, a judgment is made in step S20-4 as to whether a series of function menu registering operations have been completed and the photographer has released the push-button section 45c or not.

When the series of function menu registering operations have been completed, it is found that the push-button section 45c is being lightly depressed, with the "FUNCTION MENU REGISTERED" flag set, so that the processes from here onward are not executed, and the procedure returns to step S20-3.

When the series of function menu registering operations have not been completed yet, it means that the "FUNCTION MENU REGISTERED" flag is not set, so the procedure advances to step S20-5, where a judgment is made as to whether the push-button section 45c is being fully depressed or not. When it is not being fully depressed, it is determined that the photographer is either performing the function menu selection described with reference to FIG. 15 or going to register a function menu, so the procedure advances to step S20-12 of FIG. 24.

In step S20-12, a judgment is made as to whether the "FUNCTION MENU BEING REGISTERED" flag is set or not. Through this judgment, it is determined whether function menu selection is being performed or registration is being performed. When, in step S20-12, the "FUNCTION MENU BEING REGISTERED" flag is not set, the procedure advances to step S20-13, where a function menu display as shown in FIG. 5 is given, and, in the next step, S20-14, the line-of-sight position is detected and captured as two-dimensional coordinates.

The light-of-sight position can be captured by, for example, checking to which of the areas as shown in FIG. 19 the line of sight of the photographer is directed. Then, in step S20-15, the function menu corresponding to the line-of-sight position is nominated as a candidate, and the procedure advances to step S20-16.

In step S20-16, a judgment is made as to whether the value of the counter Cm has exceeded the threshold value Cmlim or not. If it has not exceeded the threshold value yet, the value of the counter Cm is incremented in step S20-17, and then the procedure returns to step S20-1 of FIG. 23. Thus, unless the value of the counter Cm exceeds the threshold value Cmlim, the operation when the push-button section 45c is being lightly depressed is the same as the function menu selecting operation shown in FIG. 14. As long as the push-button section 45c remains lightly depressed, the procedure circulates through the loop: step S20-1~step S20-5 of FIG. 23→step S20-12~step S20-17 of FIG. 24.

When, in step S20-6, the value of the counter Cm exceeds the threshold value Cmlim with the passage of time, the procedure advances to step S20-18, where the value of the counter Cm is reset to 0. Further, it is determined in step S20-19 that the function menu registering operation has started, and the "FUNCTION MENU BEING REGISTERED" flag is set. So far, the procedures are basically the same as those of the function menu selecting operation described with reference to FIGS. 17 and 18.

Figure 24:
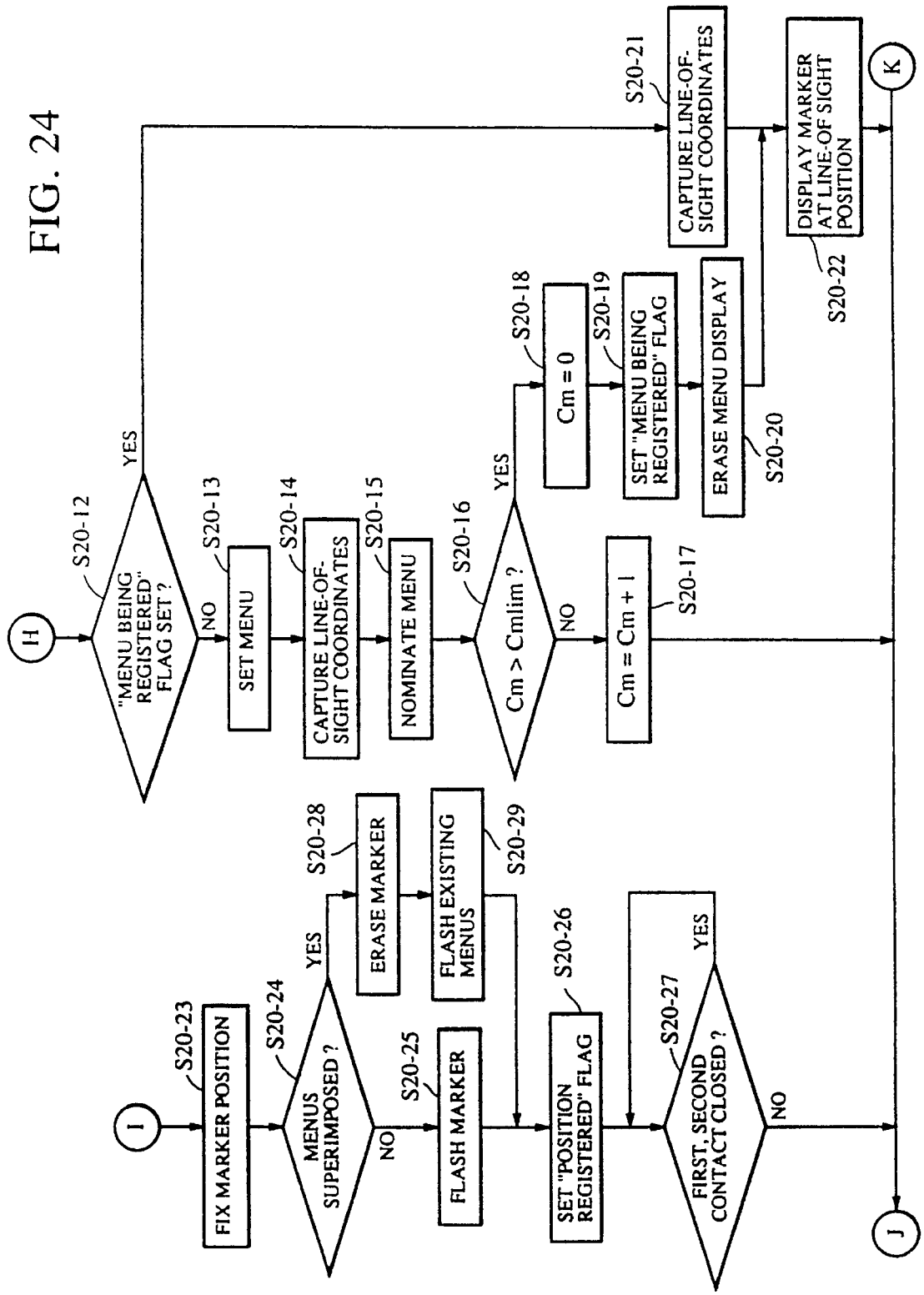
FIG. 24 is a flowchart showing operation procedures to be conducted by the operator and specific methods for executing various processes in the selection apparatus.

Next, in step S20-20 of FIG. 24, the function menu display as shown in FIG. 5 is entirely erased first, and then, in step S20-22, the marker 56 is displayed at the position of the photographer's line of sight detected in step S20-14. After this, the procedure returns to step S20-1 of FIG. 22. The position of the photographer's line of sight may be displayed in a dispersed form for each area.

If, at this time, the photographer continues to keep the push-button section 45c half-depressed, the judgment result in step S20-12 is YES since the "FUNCTION MENU BEING REGISTERED" flag has been set in step S20-19 of FIG. 24, and the procedure advances to step S20-21, where the line-of-sight coordinates are captured. Then, in the next step, S20-22, the marker 56 is displayed at the position corresponding to the line-of-sight coordinates obtained in step S20-21. That is, when the photographer moves the line of sight while keeping the push-button section 45c half-depressed, the marker 56 changes its position as: position A→position B→position C→position D to move to the relevant line-of-sight position as the procedure circulates through the loop: step S20-1~step S20-5 of FIG. 23→step S20-12→step S20-21→step S20-22 of FIG. 24.

Figure 23:
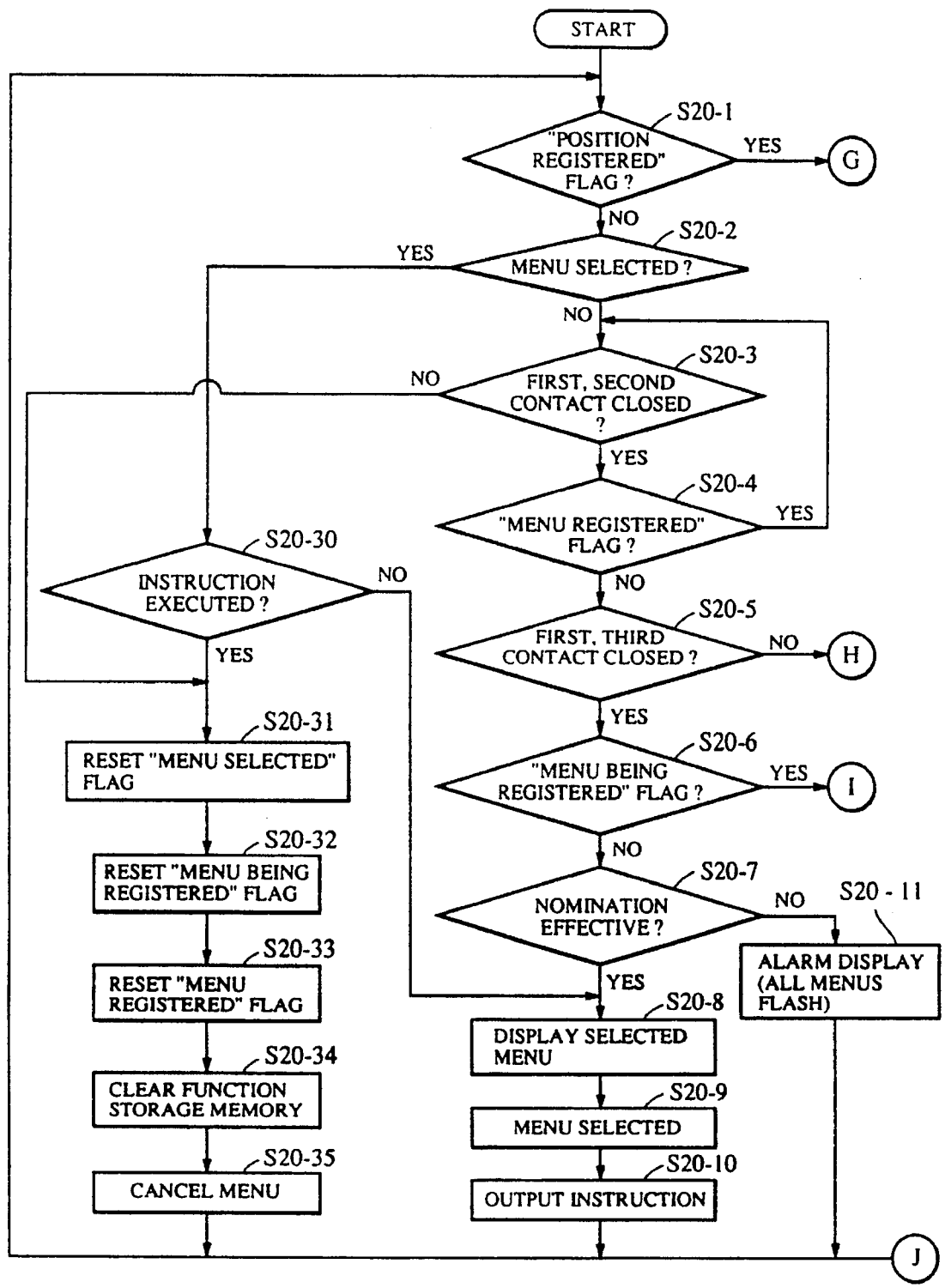
FIG. 23 is a flowchart showing operation procedures to be conducted by the operator and specific methods for executing various processes in the selection apparatus.
Figure 26:
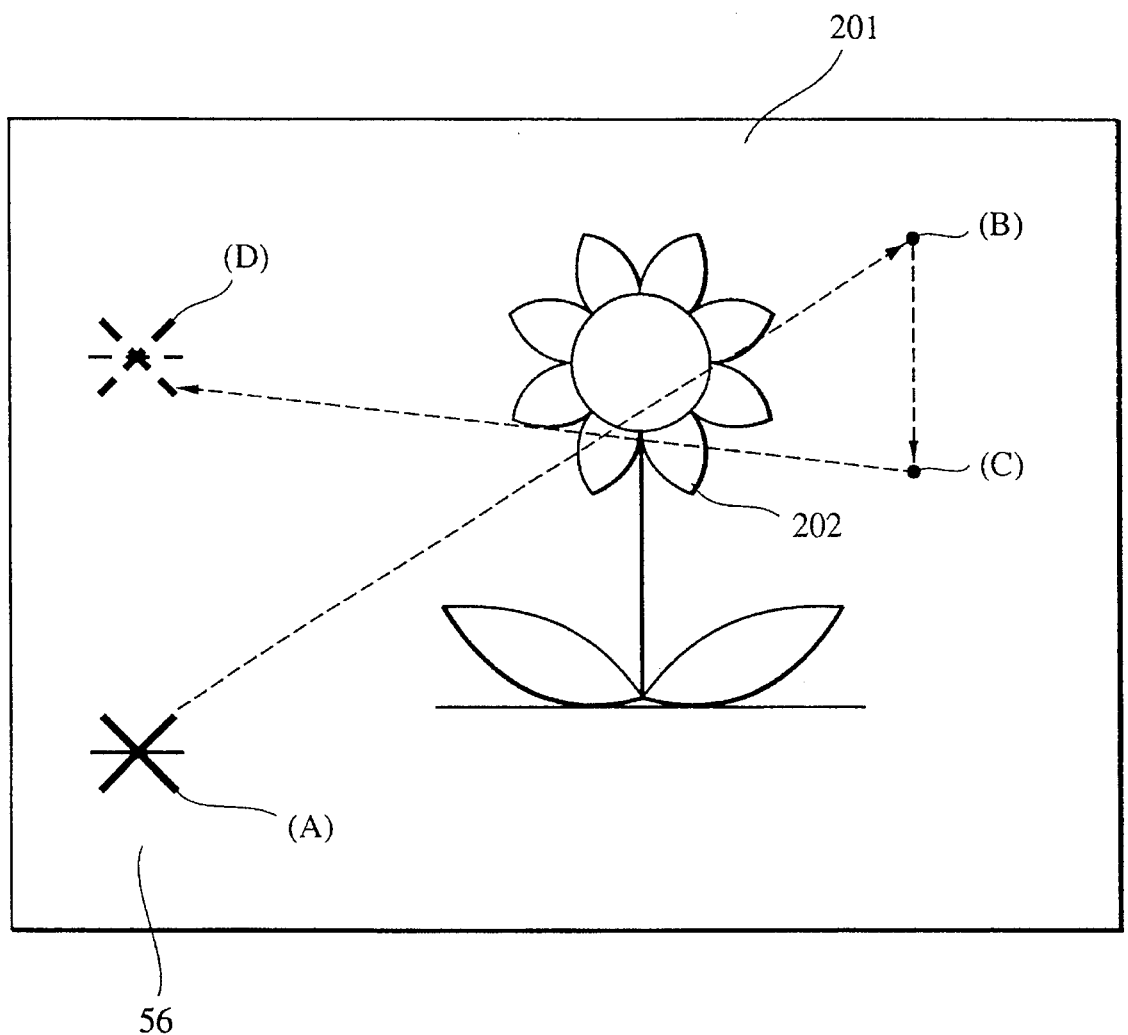
FIG. 26 is a diagram showing an example of the movement of a marker displayed on the monitor screen of the finder of a selection apparatus.

When the photographer moves the line of sight to, for example, position D of FIG. 26, and then fully depresses the push-button section 45c, the judgment result in step S20-5 of FIG. 23 is YES, and the procedure moves to step S20-6, where a judgment is made as to whether the "FUNCTION MENU BEING REGISTERED" flag is set or not. If it is not set, the procedure advances to step S20-7, where a judgment is made as to whether the nominated function menu is valid or not. If it is not valid, an alarm display is given by flashing all the function menus in step S20-11, and then the procedure returns to step S20-1.

When it is determined in step S20-7 that the nominated function menu is valid, the procedures of step S20-8~step 20-11, which are similar to those of step S15-7~step S15-10 in FIG. 17, are executed.

When, in step S20-6, the "FUNCTION MENU BEING REGISTERED" flag is set, the procedure advances to step S20-23 of FIG. 24, where the position of the marker 56 is fixed. That the photographer has fully depressed the push-button section 45c means that he or she is going to newly register a function menu at the position of his line of sight, so, in the next step, S20-24, a judgment is made as to whether there is any other registered function menu at the position where the photographer is going to effect the new registration.

As described above, the line-of-sight coordinates are provided in the form of areas 1 through 9 as shown in FIG. 19, and the judgment as to whether a function menu exists in any one of these areas can be easily made by providing a table as shown in FIG. 20 inside the central processing unit 15.

When a superimposition of function menus is detected in step S20-24 of FIG. 24, the procedure advances to step S20-28, where the marker 56, which has been following the movement of the photographer's line of sight, is erased. Instead, in step S20-29, all the function menus stored in the table of FIG. 20 are flash-displayed at their positions, whereby an alarm display is given to the photographer, who is then required to check the kind and position of the function menu already registered. After this, the procedure advances to step S20-26.

When no superimposition of function menus is detected in step S20-24, the procedure advances to step S20-25, where the marker 56, which has been changing its position with the movement of the line of sight, is flashed at the fixed position mentioned above, and, in the next step, S20-26, the "POSITION REGISTERED" flag, which indicates that the position of the function menu has been registered, is set.

Whether a superimposition of function menus is detected in step S20-24 or not, the "POSITION REGISTERED" flag is set in step S20-36, and the position of the marker 56, fixed in step S20-23, is maintained. After this, the apparatus is left in standby until the photographer releases the push-button section 45c. When the push-button section 45c is released, this process is terminated.

Figure 25:
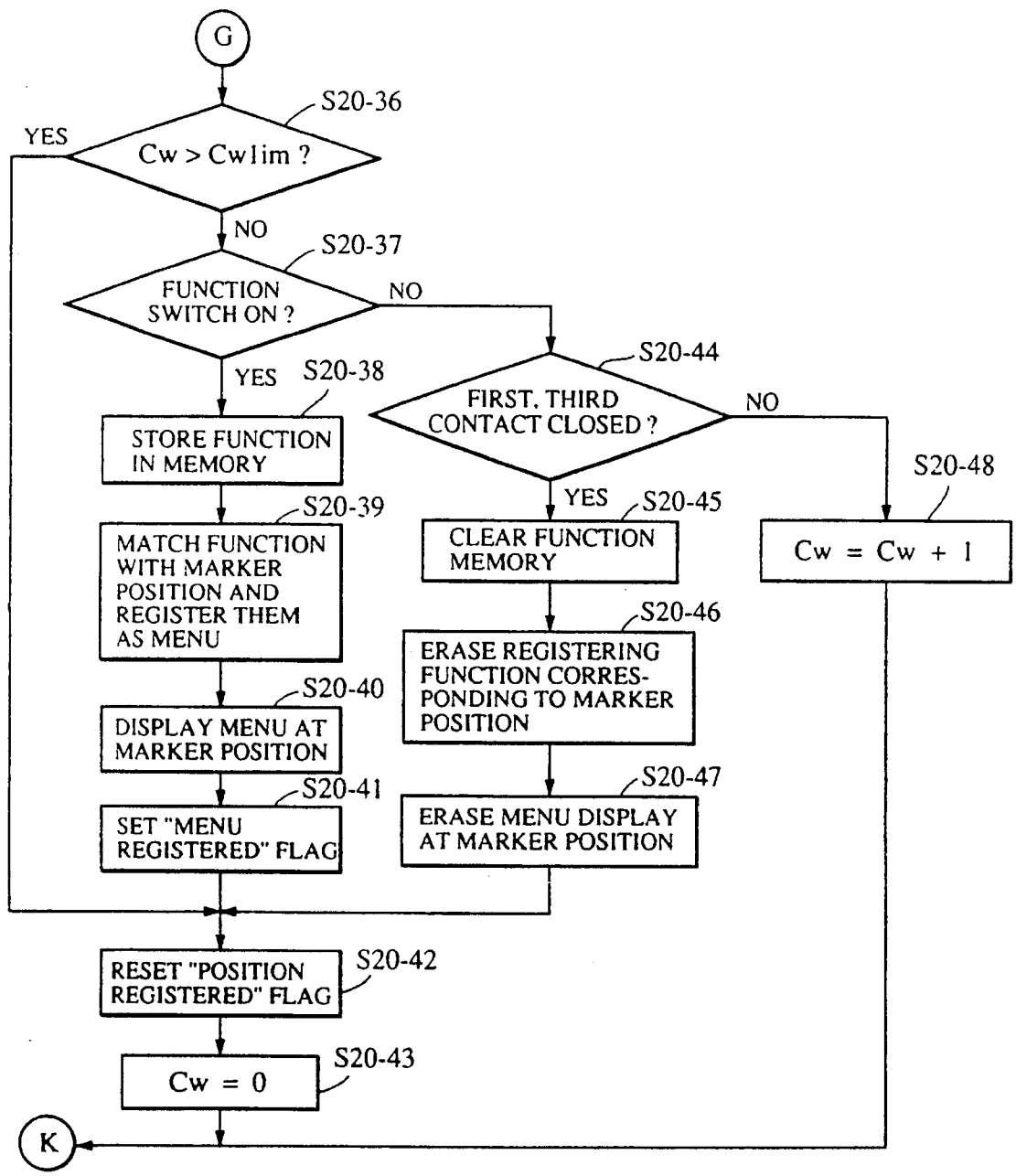
FIG. 25 is a flowchart showing the operation procedures for the operator and specific methods for executing various processes in the selection apparatus.

On the other hand, if the "POSITION REGISTERED" flag is found to be set in step S20-1, the procedure advances to step S20-36 of FIG. 25. In step S20-36, a judgment is made as to whether the value of the counter Cw is in excess of the predetermined value Cwlim or not. The function of the counter Cw will be described below.

When the value of the counter Cw is not in excess of the predetermined value Cwlim, a judgment is made in step S20-37 as to whether a function switch, such as the zoom TELE key, has been turned on or not. By depressing a function switch, the photographer can register the relevant function as the function menu of the line-of-sight position at a desired position. When a function switch has been turned on, a function discrimination code for discriminating the function corresponding to the function switch is stored in a predetermined memory in step S20-38, and, in the next step, S20-39, the function discrimination code is stored at the address in the table of FIG. 20 corresponding to the position of the marker 56.

Then, in step S20-40, the function menu to be registered is displayed at the position of the marker 56, and the photographer knows that the registration of the function menu has been accepted. Further, in step S20-41, the "FUNCTION MENU REGISTERED" flag is set, and, in the next step, S20-41, the "POSITION REGISTERED" flag is reset. Then, in step S20-43, the value of the counter Cw is set to 0. After this, the procedure returns to step S20-1 of FIG. 23.

If the function switch is not turned on in step S20-37 of FIG. 25, the procedure advances to step S20-44, where a judgment is made as to whether the push-button section 45c has been fully depressed again or not. By fully depressing the push-button section 45c again, it is possible to erase the function menu at the position where the marker 56 is fixed. This erasing operation is conducted through the procedures after the transition from step S20-37 to step S20-44.

When it is determined in step S20-44 that the push-button section 45c has been fully depressed, the memory for the function discrimination code is cleared in step S20-45, and, in step S20-46, the contents of the memory are transferred to the address in FIG. 20 corresponding to the position of the marker 56. Further, after erasing the display of the function menu at the position in step S20-47, the procedure advances to step S20-42, where the "POSITION REGISTERED" flag is reset.

Figure 27:
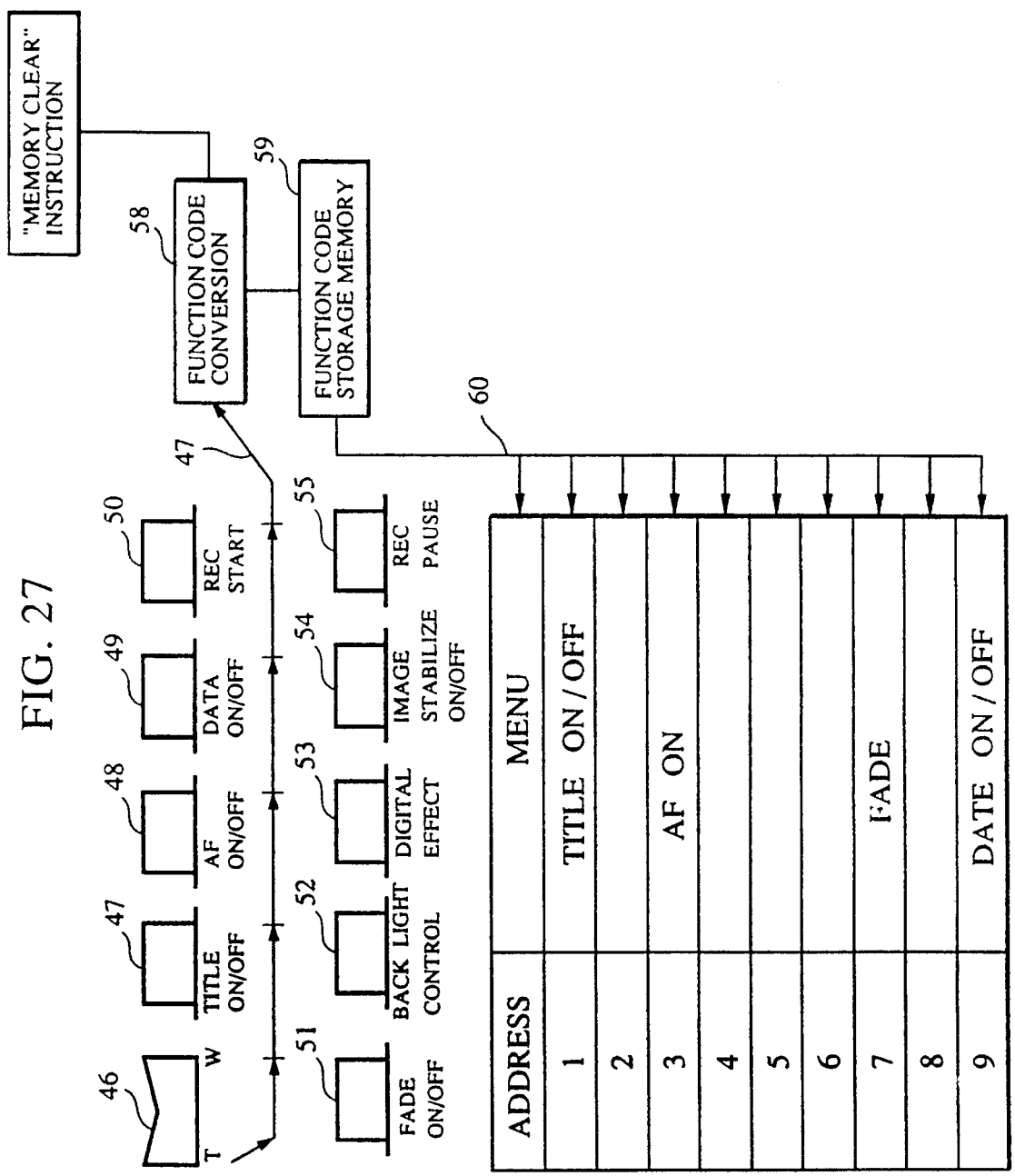
FIG. 27 is a diagram for illustrating a method of registering new function menus in the selection apparatus by utilizing a memory for storing function discriminating codes.

Next, a process for newly registering a function menu by utilizing the above-mentioned memory for function discrimination codes will be described with reference to FIG. 27.

Various control switches (not shown) are connected inside the central processing unit 15 shown in FIG. 12. FIG. 26 shows typical examples of these control switches, which include: a TW (tele/wide) switch 46, a TITLE ON/OFF switch 47, an AF ON/OFF switch 48, a DATE ON/OFF switch 49, a REC START switch 50, a FADE ON/OFF switch 51, a BACK LITE CONTROL switch 52, a DIGITAL EFFECT switch 53, an IMAGE STABILIZE ON/OFF switch 54, and REC PAUSE switch 55.

The TW switch 46 is a scaling switch for zooming. The TITLE ON/OFF switch 47 is a switch for turning ON/OFF the title recording operation. The AF ON/OFF switch 48 is a switch for turning ON/OFF the autofocusing operation. The DATE ON/OFF switch 49 is a switch for turning ON/OFF the data recording operation. The REC START switch 50 is a switch for starting the recording operation. The FADE ON/OFF switch 51 is a switch for turning ON/OFF the fading operation. The BACK LITE CONTROL switch 52 is a switch for back light correction. The DIGITAL EFFECT switch 53 is a switch for performing an operation utilizing a digital effect. The IMAGE STABILIZE ON/OFF switch 54 is a switch for turning ON/OFF a vibration isolating operation. The REC PAUSE switch 55 is a switch for setting the recording operation in a standby state.

A depression of any of the above switches 46 through 55 is signalled through a signal line 57 to a function code conversion block 57 which is provided inside the central processing unit 15. The function corresponding to the switch depressed is converted into a discriminable code in the central processing unit 15, and stored in a function discriminating code storage memory 59. A memory clear instruction signal for cancelling a registered function menu can be input to the function code conversion block 58. When supplied with this instruction signal, the function code conversion block 58 clears the function discriminating code storage memory 59.

The function discriminating code stored in the function discriminating code storage memory 59 or the cleared information is copied at the corresponding address in the table of FIG. 20 through a signal line 60.

If it cannot be determined in step S20-44 whether the push-button section 45c has been fully depressed or not, it means that neither a function switch nor the function menu selecting switch (the switch unit 45) has been fully depressed, so that it cannot be determined whether the photographer has the intention of newly registering a menu or cancelling the new function menu registration or not. In such a case, the counter Cw is incremented in step S20-48 of FIG. 25, and then the procedure returns to step S20-1 of FIG. 23.

When neither a function switch nor the function menu selecting switch has been depressed, the procedure circulates through the loop: step S20-1 of FIG. 23→step S20-36→step S20-37→step S20-44→step S20-48 of FIG. 25→step S20-1 of FIG. 23. Thus, the value of the counter Cw increments at each circulation to presently exceed the predetermined value Cwlim. When the condition: Cw>Cwlim is attained, the procedure returns from step S20-1 of FIG. 25 to step S20-1 of FIG. 23 through the route: step S20-42→step S20-43. Then, the procedure advances from step S20-2 to step S20-30.

In step S20-30, a judgment is made as to whether the execution of the instruction has been completed or not. If not, the procedure advances to step S20-8. If it has been completed, the "FUNCTION MENU BEING REGISTERED" flag and the "FUNCTION MENU REGISTERED" flag are reset in steps S20-32 and S20-33, respectively. Then, in the next step, S20-34, the function menu storage memory is cleared, and, in step S20-35, the function menu is cancelled. After this, the procedure returns to step S20-1. In this way, the function menu registering operations are all cancelled. That is, when the photographer wishes to suspend the registration of a function menu, he or she may leave it as it is, whereby the registering operation can be cancelled in a predetermined length of time.

Similarly, when the push-button section 45c of the switch unit 45 has not been turned on in step S20-3, the procedures of step S20-31~step S20-35 are carried out, thereby entirely cancelling the function menu registering operation.

In the selection apparatus of this embodiment, it is not only possible to move a function menu, whose position has been fixed, to a position convenient for the operator as he selects the function menu with his or her line of sight, but also any additional function menu which the operator desires can be provided at a desired position. Further, a function menu which the operator does not require can be cancelled, whereby malfunction of the function apparatus due to an error in gazing at menus can be prevented, and, at the same time, the display on the screen can be further tidied up and the function menu selection with the line of sight can be more effectively utilized.

As described in detail, not only can the operator reliably select a function without a visual check, but the kind of function can be displayed on a display means like a finder only when the operator desires it, and it is possible for the function corresponding to the function menu being gazed at by the operator to be executed.

Further, the operational complexity in the prior art can be substantially mitigated.

In addition, malfunction of the function apparatus due to erroneous menu gazing can be prevented, and the function of menu selection with the line of sight can be utilized more effectively.

The individual components shown in outline or designated by blocks in the Drawings are all well known and the line-of-sight selection arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A selection apparatus comprising:

display means for indicating a plurality of displays on the same screen;

line-of-sight position detecting means for detecting a line-of-sight position of an operator on said screen;

input means through which the operator inputs an instruction, said input means operating without using a line of sight; and control means for selecting at least one of said plurality of displays indicated by said display means in accordance with said line-of-sight position and said instruction, wherein said control means erases at least the non-selected displays and executes the contents of the selected display.

2. A selection apparatus according to claim 1, wherein said display means comprises a finder of a camera.

3. A selection apparatus according to claim 1, wherein said display means comprises a monitor.

4. A selection apparatus according to claim 1, wherein said input means comprises a push-button switch.

5. A selection apparatus according to claim 1, wherein said input means comprises a dial switch.

6. A selection apparatus according to claim 1, wherein said input means comprises a lever switch.

7. A selection apparatus according to claim 1, wherein said displays comprise character information.

8. A selection apparatus according to claim 1, wherein said displays comprise picture information.

9. A selection apparatus according to claim 1, wherein said control means blinks the selected display.

10. A selection apparatus according to claim 1, wherein said control means erases the executed selected display after the execution thereof.

11. A selection apparatus according to claim 1, further comprising alarm means for giving an alarm when the selected display is regarded as invalid.

12. A selection apparatus comprising:

display means for indicating a plurality of displays on the same screen;

line-of-sight position detecting means for detecting a line-of-sight position of an operator on said screen;

input means through which the operator inputs an instruction, said input means operating without using a line of sight; and control means which, when said line-of-sight position detecting means detects the line-of-sight position on any of said displays, and an instruction is input through said input means, selects the display on which the line-of-sight position has been detected, and which, when execution of the contents of the selected display is impossible, cancels the selecting operation.

13. A selection apparatus according to claim 12, wherein said display means comprises a finder of a camera.

14. A selection apparatus according to claim 12, wherein said display means comprises a monitor.

15. A selection apparatus according to claim 12, wherein said input means comprises a push-button switch.

16. A selection apparatus according to claim 12, wherein said input means comprises a dial switch.

17. A selection apparatus according to claim 12, wherein said input means comprises a lever switch.

18. A selection apparatus according to claim 12, wherein said displays comprise character information.

19. A selection apparatus according to claim 12, wherein said displays comprise picture information.

20. A selection apparatus according to claim 12, wherein said control means further differentiates a status of display of the selected display from those of the non-selected displays.

21. A selection apparatus according to claim 20, wherein said control means erases the non-selected displays.

22. A selection apparatus according to claim 20, wherein said control means blinks the selected display.

23. A selection apparatus according to claim 20, wherein said control means further executes contents of the selected display, and after the executing operation, said control means erases the executed selected display.

24. A selection apparatus according to claim 12, further comprising alarm means for giving an alarm when the selected display is regarded as invalid.

25. A selection apparatus comprising:
display means for indicating a plurality of displays on the same screen;
line-of-sight position detecting means for detecting a line-of-sight position of an operator on said screen;
input means through which the operator inputs an instruction, said input means operating without using a line of sight; and
control means which, when said display means indicates all the displays on the same screen in response to an instruction input through said input means, and said line-of-sight position detecting means detects the line-of-sight position on any of said displays, selects the display on which the line-of-sight position has been detected, erases at least the non-selected displays, and executes the contents of the display thus selected.

26. A selection apparatus according to claim 25, wherein said display means comprises a finder of a camera.

27. A selection apparatus according to claim 25, wherein said display means comprises a monitor.

28. A selection apparatus according to claim 25, wherein said input means comprises a push-button switch.

29. A selection apparatus according to claim 25, wherein said input means comprises a dial switch.

30. A selection apparatus according to claim 25, wherein said input means comprises a lever switch.

31. A selection apparatus according to claim 25, wherein said displays comprise character information.

32. A selection apparatus according to claim 25, wherein said displays comprise picture information.

33. A selection apparatus according to claim 25, wherein said control means blinks the selected display.

34. A selection apparatus according to claim 25, wherein said control means further erases the executed selected display.

35. A selection apparatus according to claim 25, further comprising alarm means for giving an alarm when the selected display is regarded as invalid.

36. A selection apparatus comprising:
display means for indicating a plurality of displays on the same screen;
line-of-sight position detecting means for detecting a line-of-sight position of an operator on said screen;
input means through which the operator inputs an instruction, said input means operating without using a line-of-sight; and control means which, when the instruction to change from a selected function to another function is input by said input means, controls said display means to indicate all the displays on the same screen by illuminating them, and which, when said line-of-sight detecting means detects the line-of-sight position of any of said displays, controls said display means to differentiate a status of display of the display on which said line-of-sight position has been detected from those of other displays on which said line-of-sight position has not been detected.

37. A selection apparatus according to claim 36, wherein said display means comprises a finder of a camera.

38. A selection apparatus according to claim 36, wherein said display means comprises a monitor.

39. A selection apparatus according to claim 36, wherein said input means comprises a push-button switch.

40. A selection apparatus according to claim 36, wherein said input means comprises a dial switch.

41. A selection apparatus according to claim 36, wherein said input means comprises a lever switch.

42. A selection apparatus according to claim 36, wherein said displays comprise character information.

43. A selection apparatus according to claim 36, wherein said displays comprise picture information.

44. A selection apparatus comprising:
display means for indicating a plurality of displays on the same screen;
line-of-sight position detecting means for detecting a line-of-sight position of an operator on said screen;
input means through which the operator inputs an instruction, said input means operating without using a line of sight; and
control means which, when said input means is in a first condition, selects one of said displays in accordance with said line-of-sight position, and, which, when said input means is in a second condition, differentiates a status of display of the selected display from those of the non-selected displays and executes the contents of the display selected.

45. A selection apparatus according to claim 44, wherein said display means comprises a finder of a camera.

46. A selection apparatus according to claim 44, wherein said display means comprises a monitor.

47. A selection apparatus according to claim 44, wherein said input means comprises a push-button switch.

48. A selection apparatus according to claim 44, wherein said input means comprises a dial switch.

49. A selection apparatus according to claim 44, wherein said input means comprises a lever switch.

50. A selection apparatus according to claim 44, wherein said displays comprise character information.

51. A selection apparatus according to claim 44, wherein said displays comprise picture information.

52. A selection apparatus comprising:
display means for indicating a plurality of displays on the same screen;
line-of-sight position detecting means for detecting a line-of-sight position of an operator on said screen;

input means through which the operator inputs an instruction, said input means operating without using a line of sight; and control means which, if said line-of-sight position detecting means detects said line-of-sight position on one of said displays when said input means is in a first condition, selects the display on which said line-of-sight position has been detected and moves the selected display in accordance with a movement of said line-of-sight position, and, which, when said input means is in a second condition, stops the movement of the selected display.

53. A selection apparatus according to claim 52, wherein said display means comprises a finder of a camera.

54. A selection apparatus according to claim 52, wherein said display means comprises a monitor.

55. A selection apparatus according to claim 52, wherein said input means comprises a push-button switch.

56. A selection apparatus according to claim 52, wherein said input means comprises a dial switch.

57. A selection apparatus according to claim 52, wherein said input means comprises a lever switch.

58. A selection apparatus according to claim 52, wherein said displays comprise character information.

59. A selection apparatus according to claim 52, wherein said displays comprise picture information.

60. A selection apparatus comprising:

line-of-sight position detecting means for detecting a line-of-sight position of an operator on a screen;

display means for indicating on the same screen (i) a plurality of displays and (ii) a marker which shows the detected line-of-sight position;

input means through which the operator inputs an instruction, said input means operating without using a line-of-sight; and control means which, when said input means is in a first condition, extinguishes the displays except the marker, and which, when said input means is in a second condition, selectively shows a display indicated by said display means at the line-of-sight position where the marker has been indicated.

61. A selection apparatus according to claim 60, wherein said display means comprises a finder of a camera.

62. A selection apparatus according to claim 60, wherein said display means comprises a monitor.

63. A selection apparatus according to claim 60, wherein said input means comprises a push-button switch.

64. A selection apparatus according to claim 60, wherein said input means comprises a dial switch.

65. A selection apparatus according to claim 60, wherein said input means comprises a lever switch.

66. A selection apparatus according to claim 60, wherein said displays comprise character information.

67. A selection apparatus according to claim 60, wherein said displays comprise picture information.

68. A selection apparatus comprising:

display means for indicating a plurality of displays on the same screen;

line-of-sight position detecting means for detecting a line-of-sight position of an operator on said screen; and control means for moving at least one of said plurality of displays indicated on said screen in accordance with the line-of-sight position of the operator detected by said line-of-sight position detecting means, and for inhibiting said display from moving to a position where another display has been indicated on said screen.

\* \* \* \* \*

UNITED STATES PATENT AND TRADEMARK OFFICE
CERTIFICATE OF CORRECTION

PATENT NO. : 5,579,048
DATED : November 26, 1996
INVENTOR(S) : MASAHIDE HIRASAWA It is certified that error appears in the above-indentified patent and that said Letters Patent is hereby corrected as shown below: ON THE TITLE PAGE:

At [56] Foreign Patent Documents

Insert --5-161038  6/1993  Japan--; and
"5183798  7/1993  Japan" should read
--5-183798  7/1993  Japan--.

COLUMN 17

Line 25, "light" should read --sight--.

COLUMN 19

Line 48, "are" should read --is--.

COLUMN 21

Line 49, "have" should read --has--.
Line 55, "have" should read --has--.

Signed and Sealed this

Thirteenth Day of May, 1997

Attest:

BRUCE LEHMAN

Attesting Officer     Commissioner of Patents and Trademarks